US 9,264,627 B2

(12) United States Patent
Holmes et al.

(10) Patent No.: US 9,264,627 B2
(45) Date of Patent: Feb. 16, 2016

(54) VIDEO PHOTOGRAPHY SYSTEM

(75) Inventors: Jon A. Holmes, Eden Prairie, MN (US);
Keith A. Benson, Eden Prairie, MN (US); Vladimir L. Minustin, Plymouth, MN (US); Brett E. Zemlicka, Bloomington, MN (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

(21) Appl. No.: 13/346,471

(22) Filed: Jan. 9, 2012

(65) Prior Publication Data

US 2013/0176481 A1    Jul. 11, 2013

(51) Int. Cl.
*H04N 5/222*    (2006.01)
*H04N 9/74*    (2006.01)
*H04N 5/228*    (2006.01)
*H04N 5/235*    (2006.01)

(52) U.S. Cl.
CPC .................................. *H04N 5/2354* (2013.01)

(58) Field of Classification Search
CPC ....... H04N 5/2354; H04N 5/272; H04N 5/28; H04N 5/30; H04N 5/232; H04N 9/75
USPC ...................... 348/370–371, 586–587, 222.1, 348/231.2–231.4, 584, 216.1
See application file for complete search history.

(56) References Cited

U.S. PATENT DOCUMENTS

| | | | | |
|---|---|---|---|---|
| 5,471,295 | A * | 11/1995 | Hirotsune | ................... 356/138 |
| 6,256,067 | B1 | 7/2001 | Yamada | |
| 6,490,006 | B1 * | 12/2002 | Monjo | ......................... 348/587 |
| 6,809,772 | B1 * | 10/2004 | Motta et al. | ................... 348/341 |
| 7,834,894 | B2 | 11/2010 | Swanson et al. | |
| 7,894,713 | B1 * | 2/2011 | Clark | ..................... G03B 15/00 396/3 |
| 8,331,715 | B2 * | 12/2012 | Steinberg | ........... H04N 5/23212 348/207.99 |
| 8,983,202 | B2 * | 3/2015 | Dalton | ............... G06K 9/00308 382/118 |
| 2003/0234887 | A1 | 12/2003 | Kato | |
| 2004/0062439 | A1 * | 4/2004 | Cahill | ....................... G06T 5/50 382/173 |
| 2006/0033884 | A1 * | 2/2006 | Sato | ............................... 353/30 |
| 2006/0098894 | A1 * | 5/2006 | DiCarlo et al. | ................ 382/274 |
| 2007/0019094 | A1 * | 1/2007 | Silberstein | ................ 348/333.01 |
| 2008/0166111 | A1 * | 7/2008 | Didow et al. | ....................... 396/3 |
| 2008/0246777 | A1 * | 10/2008 | Swanson et al. | ............... 345/640 |
| 2011/0085334 | A1 * | 4/2011 | Wang | ....................... 362/249.02 |
| 2011/0227895 | A1 * | 9/2011 | Takahashi et al. | ............. 345/211 |
| 2012/0007941 | A1 * | 1/2012 | Meyer | ........................ 348/14.08 |

* cited by examiner

*Primary Examiner* — Sinh Tran
*Assistant Examiner* — Xi Wang
(74) *Attorney, Agent, or Firm* — Merchant & Gould P.C.

(57) ABSTRACT

A video photography system includes a video camera system and a background lighting system. The video camera system is configured to capture photographs of a subject positioned between the video camera system and a background. The background lighting system is configured to generate background lighting conditions on the background. The background lighting conditions include at least a first lighting condition and a second lighting condition.

26 Claims, 22 Drawing Sheets

VIDEO PHOTOGRAPHY SYSTEM

BACKGROUND

Photography of a subject has traditionally been accomplished by using still image cameras to capture individual photographs. One type of still image camera is a film camera that utilizes a light sensitive photographic film or plate to capture a photograph. With a film camera, photographs are captured and stored on photographic film. Another type of still image camera is a digital camera that utilizes an electronic image sensor to capture images that are then stored in a digital storage medium. Digital cameras have largely replaced film cameras in the market.

Digital video camera technology has become more widespread, particularly in consumer products. One of the factors contributing to this is the inclusion of digital video cameras in many mobile phones, including in most smartphones. Most, if not all, of these digital video cameras are low quality, however, and are not suitable for capturing high quality video. In addition to capturing video, many digital video cameras can also be operated to save a single frame of a video as a still image. However, such images are typically much lower quality than can be obtained from a still image camera.

Even if high quality photography equipment is used, other factors can also lead to less-than ideal photographs. One of these factors is the difficulty in capturing a photograph at the precise moment when the subject has the best facial expression. Experienced photographers can learn to anticipate when the best facial expression is about to occur, but less experienced photographers can struggle to capture the best facial expression. Similarly, different subjects also have differing reactions to the photographic environment, resulting from different aptitudes, education, and experiences with photography, and as a result, it can be difficult for a photographer to predict the exact moment of the best expression. Capturing a photograph only a moment before or a moment after a good facial expression results in a lower quality photograph than could otherwise have been obtained.

Another factor that influences the quality of photographs is an unnatural environment. If a subject does not feel comfortable in the environment, it is difficult for the subject to have a natural and pleasant looking expression. The typical photography session has various aspects that can feel unnatural to the subject, such as sudden bright flashes of light, and the hurried manner in which photographs are sometimes taken.

It is sometimes desirable to initially capture a photograph of a subject with a certain background, but to later replace that background in the photograph with a different background image. High quality techniques have been developed for replacing the background in a photograph captured by still image cameras. Techniques for replacing the background in a video, however, are typically limited to lower quality chroma key compositing (also known as greenscreen or bluescreen) techniques.

There is a need for a video photography system that can be used to capture high quality photographs for use in still image or video products.

SUMMARY

In general terms, this disclosure is directed to a video photography system. In one possible configuration and by non-limiting example, the video photography system is used to capture high quality photographs for use in still image or video products.

One aspect is a method of capturing photographs, the method comprising generating a sequence of background lighting conditions on a background, the background lighting conditions including at least a first lighting condition and a second lighting condition; and capturing photographs of a subject with a video camera, the subject being arranged between the video camera and the background, the first and second lighting conditions being distinguishable in the photographs.

Another aspect is a video photography system that includes a video camera system and a background lighting system. The video camera system is configured to capture photographs of a subject positioned between the video camera system and a background. The background lighting system is configured to generate background lighting conditions on the background. The background lighting conditions include at least a first lighting condition and a second lighting condition.

A further aspect is a video photography system comprising a video camera system and a background lighting system. The video camera system is configured to capture photographs of a subject positioned between the video camera system and a background. The background lighting system is configured to generate background lighting conditions on the background, the background lighting conditions being detectable in the photographs, wherein the background lighting conditions include at least a first lighting condition and a second lighting condition. The first lighting condition is distinguishable from the second lighting condition in the photographs.

Yet another aspect is a video photography system comprising a background structure, a video camera system, a continuous subject lighting system, and a background lighting system. The background structure includes an exterior surface having a neutral color. The video camera system includes a video camera configured to record a video of a subject arranged between the video camera system and the exterior surface of the background structure, the video including a plurality of photographs; and a system controller operable to control the video camera. The continuous subject lighting system includes a light source configured to provide continuous illumination of a subject while recording the video, the continuous lighting system including a main lighting system and a fill lighting system. The background lighting system includes at least one light source, the at least one light source configured to generate a sequence of at least two lighting conditions including a first-colored lighting condition, and a second-colored lighting condition, wherein each of the at least two lighting conditions are distinguishable in the photographs.

DETAILED DESCRIPTION

Figure 1:
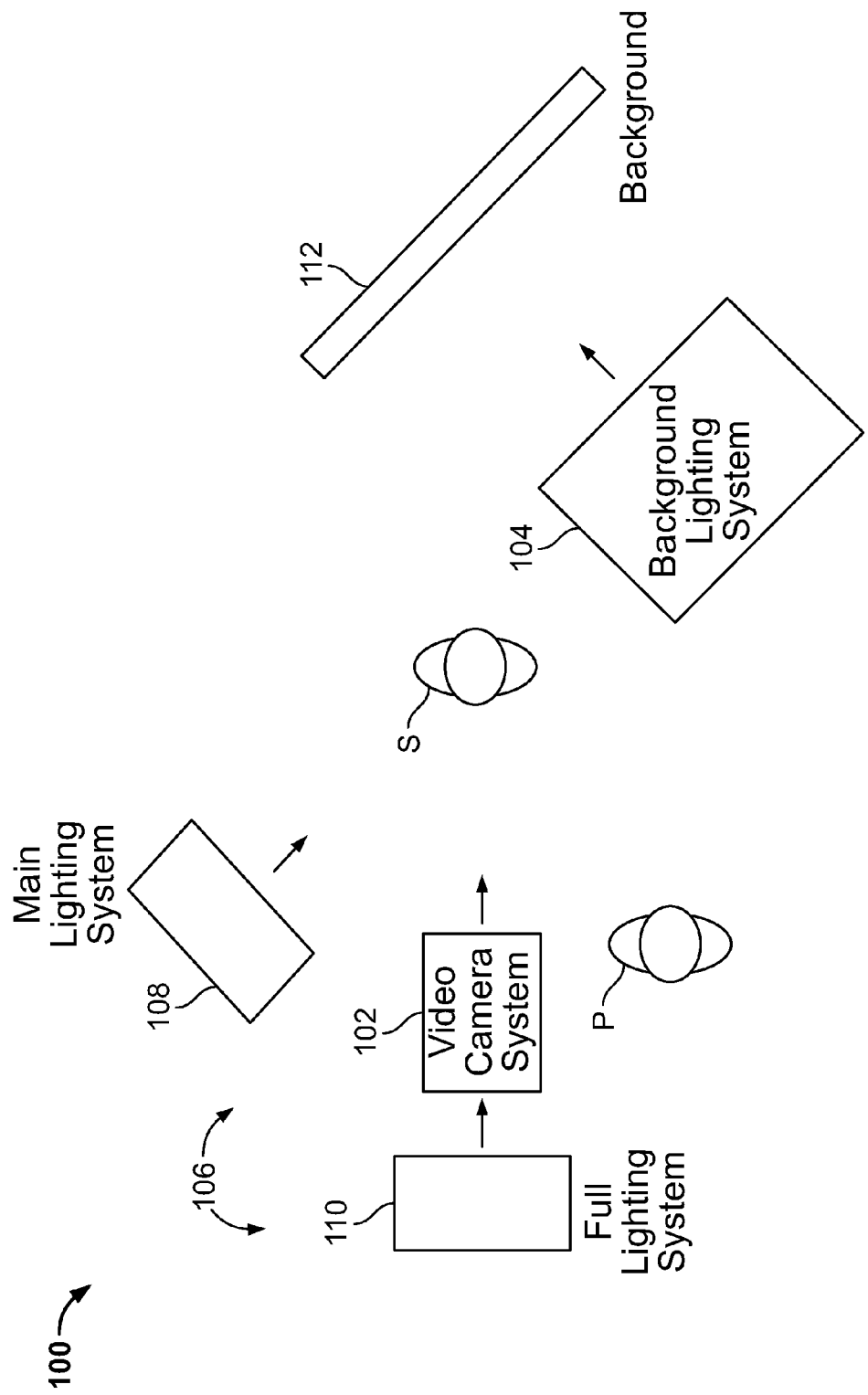
FIG. 1 is a schematic top plan view of an example video photography system according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A video photography system 100 is disclosed herein that captures photographs of a subject using a video camera. In some embodiments, the video photography system 100 includes a background lighting system that generates background lighting conditions that are captured by the video camera in the backgrounds of the photographs. Some of the background lighting conditions enable automated processing of the photographs to replace the backgrounds of the photographs with different background images. Other background lighting conditions enable the video photography system to encode data indicative of particular photographs or groups of photographs that are likely to contain the subject's best poses and/or expressions. This is sometimes referred to herein as encoding the photographer's intent. This data can be used to automate a photograph selection process, or for more quickly identifying the best photograph(s). Background lighting conditions can also be used to encode data (such as subject or job data) using predetermined lighting sequences. In some embodiments, this data and/or the data indicative of the photographer's intent can similarly be encoded as a sequence of audible tones in the audio channel of the video captured using the video photography system. Additional aspects and other embodiments of the video photography system are disclosed herein.

FIG. 1 is schematic top plan view of an example of a video photography system 100 for capturing photographs of a subject S. In this example, the video photography system 100 includes a video camera system 102, background lighting system 104, subject lighting system 106 (such as including main lighting system 108 and fill lighting system 110), and background 112.

The subject S is a person or object that is intended to be captured in a photograph. The subject S can be a single person or object, or more than one person or object. For example, the subject S may be a group of individuals.

Video camera system 102 operates to capture photographs of the subject S, when the subject S is positioned between the video camera system 102 and the background 112. The video camera system 102 includes at least a video camera device, which captures photographs of the subject S. A still image product can be generated from one or more photographs of the subject S, while a video product can be generated from multiple photographs of the subject S. An example of the video camera system 102 is illustrated and described in more detail with reference to FIG. 2.

Although the example illustrated in FIG. 1 is directed to a video photography system 100, some of the systems and methods described herein can alternatively be implemented in a still photography system including a still camera (such as a digital camera or a film camera).

The background lighting system 104 includes light sources that operate to selectively illuminate background 112. In some embodiments, the light sources are capable of rapid on/off transitions. Light emitting diodes (LEDs) are one example of suitable light sources. The background lighting system 104 is illustrated and described in more detail with reference to FIGS. 9-11.

The subject lighting system 106 operates to provide appropriate foreground illumination to the subject S. The subject lighting system 106 can include one or more light sources. A variety of different light sources can be used, such as incandescent, fluorescent, high-intensity discharge, and light emitting diode light sources. In some embodiments, the light sources provide a continuous light source during part or all of the duration of a photography session, while in other embodiments the light sources are controlled to flash one or more times, as discussed in more detail herein. Typically the subject lighting system 106 includes one or more stands to support and elevate the light sources. In addition, in some embodiments the subject lighting system 106 includes one or more light modifiers, such as an umbrella or soft box, which diffuses the light from the light source to provide the desired lighting pattern and distribution.

In some embodiments, the subject lighting system 106 includes a main lighting system 108 and a fill lighting system 110. The main lighting system 108 provides the primary illumination, and can be offset toward one side of the subject S in some embodiments. The fill lighting system 110 provides the secondary illumination, and can be positioned in line with the video camera system 102, subject S, and background 112 in some embodiments.

In other possible embodiments, the subject lighting can be provided by another light source, such as the sun or other lights that may already be present or available at the site where the photographs are to be taken.

The background 112 is an object arranged in line with the subject S and the video camera system 102 to provide a suitable backdrop for photographs captured by the video camera system 102. In some embodiments, the background 112 is a background structure. The background 112 typically has an exterior surface having a neutral color. In some embodiments the exterior surface has a substantially non-textured dark gray color. However, in other embodiments the exterior surface is textured, and in some embodiments other colors are used.

The background 112 typically includes a frame or stand that supports the background material having the exterior surface. In some embodiments the background material is substantially opaque, while in other embodiments the background material is translucent. For example, in some embodiments the background lighting system 104 is configured to directly illuminate a rear surface of the background material, and light from the background lighting system 104 passes through the translucent background material, so that it is visible on the exterior surface.

In other embodiments, however, the background 112 is a separate object that is not a part of the video photography system 100. Examples of such backgrounds 112 include a wall, a curtain, a whiteboard, or other structure having an exterior surface that can be illuminated by the background lighting system 104. The best results will typically be obtained with a background 112 having a neutral color and little to no visible texture.

In yet another possible embodiment, the background 112 and the background lighting system 104 are the same device. In this example, the background lighting system 104 is positioned behind the subject S and within the view of the video camera system 102, such that light generated by the background lighting system 104 is directly visible by the camera rather than indirectly illuminating background 112. In some embodiments, the background lighting system 104 includes a display device, such as a flat panel display. Examples of flat panel displays include LED displays, plasma displays, digital light processing displays, and the like, many of which are commonly used as television or computer displays. Such a display can alternatively be arranged behind a background 112 to illuminate the background 112 from behind.

Figure 2:
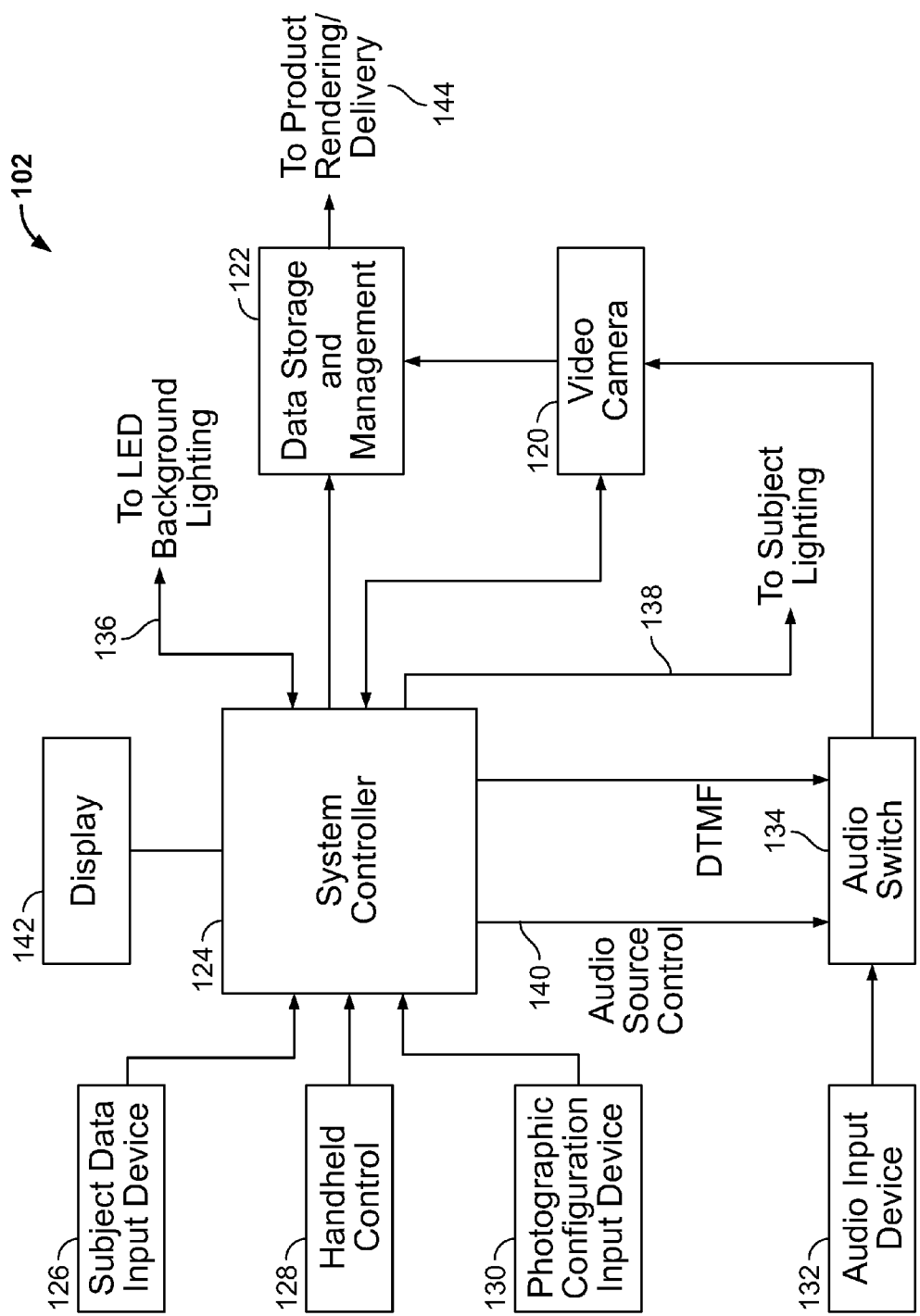
FIG. 2 is a schematic block diagram of an example video camera system, of the video photography system shown in FIG. 1.

FIG. 2 is a schematic block diagram of an example video camera system 102. In some embodiments, the video camera system 102 includes a video camera 120 and a data storage device 122. The data storage device 122 can be separate from or part of the video camera 120.

In other embodiments, the video camera system 102 further includes one or more of a system controller 124, a subject data input device 126, a handheld control 128, a photographic configuration input device 130, an audio input device 132, an audio switch 134, an output 136 to the background lighting 104, and an output 138 to the subject lighting 106.

The video camera 120 operates to capture multiple photographs in rapid succession. Each photograph is sometimes referred to herein as a frame. The video camera 120 is typically a digital video camera, though some other embodiments include a film video camera.

In order to provide high quality products, a high resolution video camera 120 is desired, such as a high definition video camera. For example, in some embodiments the resolution of the video camera 120 is greater than about 1280×720 pixels. In some embodiments the resolution is greater than about 1920×1080 pixels. In another embodiment, the resolution is in a range from about 1280×720 pixels to about 3840×2160 pixels ("4K"), including the 2048×1556 pixels ("2K") resolution. However, other resolutions can also be used, such as lower resolutions (e.g., from about 320×240 to about 640× 480 with a decrease in product quality) or higher resolutions.

In some embodiments, the video camera 120 has a high frame rate. For example, in some embodiments the video camera 120 has a high frame rate equal to or greater than about 60 frames per second. In yet other embodiments, the high frame rate is in equal to or greater than about 120 frames per second. In some embodiments, the frame rate is 1000 frames per second or more. In some embodiments, the video camera 120 utilizes progressive scan technology. Lesser frame rates and other video technologies (e.g., cinema and interlaced video technologies) can be used, with a potential decrease in quality of the final product.

In some embodiments, video camera 120 is shutterless, such that it does not include a mechanical shutter. In other embodiments, the video camera 120 has a mechanical shutter, but the mechanical shutter is not used during video recording.

The video camera 120 typically operates to capture multiple photographs in rapid succession and store the photographs in a sequenced order in a computer readable storage media. The video camera 120 can also record audio and store one or more audio channels in association with the photographs. In some embodiments, the video camera includes built in tools for gathering and sequencing multiple still frames. The audio and video can be stored using standard digital video encoding and formats in digital video files. In some embodiments, the video files do not include EXIF data (exchangeable image file format data, that is available in some image file formats) in which metadata can be stored related to the photographs or audio.

Examples of a possible video camera 120 include the Sony Professional 4K digital motion picture camera available from Sony Electronics Inc., of Park Ridge, N.J. This camera utilizes an 8K CMOS sensor and can run up to 120 frames per second. Another example is the Canon VIXIA HF21 dual flash memory camcorder available from Canon U.S.A. Inc., of Lake Success, N.Y. Yet another example is the model number D7000 digital SLR camera, available from Nikon Inc., of Melville, N.Y. Another example is the model number GC-PX10 high frame high resolution video camera, available from JVC U.S.A. Further, the Canon 4K Concept Camera, which may become a commercially available product in the future, and would likely be a suitable video camera 120.

In another possible embodiment, the video camera 120 captures high resolution photographs and outputs the photographs frame by frame in an uncompressed stream through a high speed interface, such as a high definition multimedia interface (HDMI) port. A computing device, such as the computing device shown in FIG. 24, receives the stream and stores the stream in a computer readable storage device. In some embodiments a video stream capture device is used to receive the uncompressed video stream, which then feeds the stream to another computing device for processing.

Other embodiments can utilize other video compression or encoding techniques. For example, inter frame prediction can be used in some embodiments. The encoding of a particular photograph can refer to or require additional data encoded in one or more other photographs. As a result, the evaluation of a particular photograph may require, in some embodiments, data from one or more other photographs.

Data storage device 122 is a physical device that stores digital data generated by the video camera 120 and encoding photographs of the subject S. An example of a data storage device is a random access memory (RAM) storage device. Other embodiments utilize other types of data storage devices, such as a hard disk drive, a magnetic cassette, a flash memory card, a digital video disk, a Bernoulli cartridge, a compact disc read only memories, a digital versatile disk read only memory, and a read only memory, or a combination of these. These physical devices are also examples of computer readable storage devices.

The data storage device 122 can be a part of the video camera 120 or a separate device. When a separate device, data is transferred between the data storage device 122 through wires via one or more electrical conductors, or wirelessly, such as using radio frequency communication devices. In some embodiments, the data communication occurs across a network.

The system controller 124 is provided in some embodiments to coordinate and control certain operations performed by the video photography system 100. The system controller 124 may be one or more processing devices including a microprocessor, a microcontroller, a computer, or other suitable devices that control the operation of devices and/or execute programs. The system controller 124 can include various other processor devices, including central processing units ("CPUs"), microcontrollers, programmable logic devices, field programmable gate arrays, digital signal processing ("DSP") devices, and the like. Further, the system controller 124 may include any general variety device such as a reduced instruction set computing ("RISC") device, a complex instruction set computing ("CISC") device, or a specially designed processing device such as an application-specific integrated circuit ("ASIC") device.

In some embodiments, the system controller 124 includes one or more computer readable storage devices. Program instructions can be stored on one or more computer readable storage devices for execution by a processor device. When executed by the processor device, the program instructions cause the processor device to perform one or more of the methods, operations, or functions described herein.

The system controller 124 is electrically coupled to the video camera 120 and operates as a video camera controller, to send control signals to the video camera 120 to control the operation of the video camera 120, such as to start and stop recording, zoom in and out, and adjust and control other camera settings, operations, and parameters, such as described herein.

The subject data input device 126 is provided in some embodiments to receive information identifying or related to the subject S. When photographing a large number of different subjects, for example, the subject data input device 126 can be used to receive subject data identifying the subject S in the photograph. The subject data input device 126 is in data communication with the system controller 124 that receives the subject data (either via electrical conductors or wirelessly) and stores the subject data in association with photographs of the subject S, so that the identity of the subject S in each photograph can be later identified. In addition to subject data, a variety of other types of data can also be input through the subject data input device 126. Examples of this data include product order information, job or session related data, subject data, affinity data (such as team, club, class, or other group affiliations).

In some embodiments, the subject data input device 126 is a barcode scanner. For example, in some embodiments each subject S is associated with a card including a barcode. The barcode can be scanned to retrieve the data from the card. The data includes the subject data, and can also include other data. Other examples of subject data input devices 126 include a keyboard, a touch screen, a mouse, a laptop computer, a desktop computer, a microphone for receiving voice inputs, and other input devices.

The handheld control 128 receive inputs from the photographer P during a photography session, such as to start or stop the photography session, to initiate the capture of a photograph, to zoom in or out, or to identify a particular frame or set of frames captured during a photography session. An example of the handheld controller is illustrated and described in more detail with reference to FIG. 6. In another possible embodiment, the handheld control 128 is a touch screen display, a laptop computer, a mobile computing device, etc. In some embodiments, the handheld control 128 and the subject data input device 126 are the same device, or physically connected to each other.

In another possible embodiment, the photographer P can be located remote from the subject S, and interact with the video photography system and the subject S remotely. For example, the video camera 120 or another video camera can be used to capture a video that is transmitted to a computing device where it is displayed to the photographer to permit the photographer to observe the photography session. The photographer speaks into a microphone and/or video camera, which is transmitted back to the video photography system 100 (such as through speakers and a display device) to permit the photographer P to engage with subject S during the photography session. In another possible embodiment, the photographer P can be replaced by a video recording, audible instructions, or text instructions, such as when the video photography system 100 is arranged in an automated photo booth configuration.

The photographic configuration input device 130 operates to receive additional inputs from the photographer P to adjust between various operational modes, or to set or adjust various operational parameters. In some embodiments the photographic configuration input device 130 is part of the handheld control 128, while in other embodiments the photographic configuration input device 130 is a separate device, such as a touch screen, a computer, a barcode scanner, or other input device. In some embodiments the photographic configuration input device 130, the handheld control 128, and the subject data input device 126 are all a single device. The photographic configuration input device 130 is in data communication with the system controller 124 to provide the photographic configuration inputs to the system controller 124, such as through electrical conductors or wirelessly. As discussed in more detail herein, the photographic configuration is determined automatically, in some embodiments, without requiring additional effort on the part of the photographer P or the subject S.

The audio input device 132 detects sound and converts the sound into an electrical signal. An example of an audio input device 132 is a microphone. In some embodiments, the audio input device 132 is part of the video camera 120, while in other embodiments the audio input device 132 is a separate device. The audio input device 132 can be used to record sounds during a video recording, such as the voice of the subject S, ambient noise, etc. In some embodiments, the audio input device 132 is in data communication with (via electrical conductors or wirelessly) and generates electrical signals that are provided to the video camera 120. In some embodiments, the audio input device 132 is in data communication with the audio switch 134, that selectively provides the output from the audio input device 132 to the video camera 120.

The audio switch 134 is provided in some embodiments to select between multiple different audio sources, such as through an audio source control 140. The audio switch 134 is in data communication with the audio input device 132 and an audio output of the system controller 124, for example, through electrical conductors or wirelessly. When the voice of the subject S or other ambient sounds are to be recorded, the audio switch 134 receives the electrical signals generated by the audio input device 132 and passes the electrical signals to the video camera 120, or to another device where the audio is stored in a memory device. The audio is typically stored using a digital audio format, but analog or other storage formats can also be used.

In some embodiments, audio signals are generated by an audio output port of the system controller 124. When the sounds are generated, the audio switch 134 operates to receive the electrical signals from the audio output port of system controller 124 and pass the electrical signals to the video camera 120 where they are recorded, or to another device. For example, data can be encoded using dual tone multi-frequency (DTMF) encoding. In some embodiments, the data is encoded as audible sounds in one of multiple audio tracks, such as a right or left audio track, where the other track is used to record ambient sounds.

In another possible embodiment, the same data can alternatively be encoded into the video channel using a background light illumination sequence, which can be based on a binary encoding of on-off sequences, or based on color variations (e.g., RGB can be used to generate 16 million colors, at least some of which could be used for encoding data—such as by representing certain characters or words by certain colors).

In some embodiments the video camera system 102 operates asynchronously with the background lighting system 104 and the subject lighting system 106. In such embodiments, the video camera system 102 can be free of electrical wires or other data communication with the background lighting system 104 and the subject lighting system 106, because each device is capable of operating independent from the other. For example, the foreground lighting system can utilize continuous lighting that is turned on and off by a switch. In addition, the background lighting system 104 can be modulated at a frequency sufficiently less than the frame rate of the video camera 120 to ensure that a background lighting system 104 is illuminated for more than the duration of an entire frame of a video camera.

In other embodiments, however, the background lighting system 104 and the subject lighting system 106 are synchronized. In this example, the video camera system 102 includes one or more of the background lighting output port 136 and the subject lighting output port 138. The output ports provide timing signals to the background lighting system and the subject lighting system 106 to permit synchronization between the illumination(s) of the lighting systems and the capturing of photographs with the video camera 120.

Figure 10:
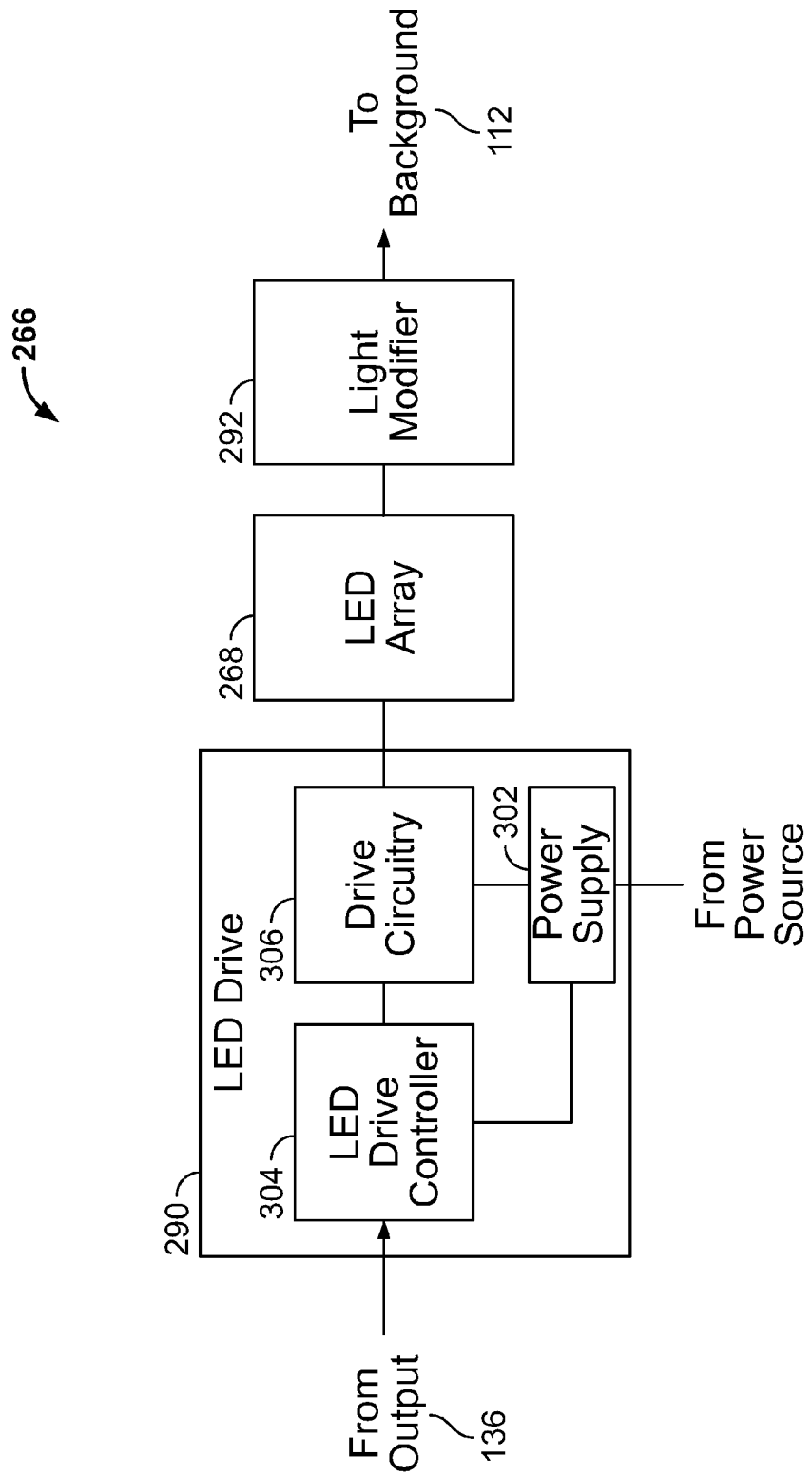
FIG. 10 is a schematic block diagram of an example lighting module of the background lighting system shown in FIG. 9.

In some embodiments the video camera system 102 includes one or more driver circuits that are configured to supply an appropriate voltage and current to the background lighting system 104 and the subject lighting system 106. Alternatively, the driver circuits are included as part of the background lighting system 104 and/or the subject lighting system 106, such as illustrated in FIG. 10.

Some embodiments further include a display 142. Examples of suitable displays 142 include those utilizing liquid crystal display or light-emitting diode display technologies. In some embodiments, display 142 is a touch sensitive display. The touch sensitive display 142 can be used as one or more of the input devices 126, 128, and 130, in some embodiments.

After photographs have been captured by the video camera, and stored in the data storage device 122, the photographs can be transferred to a product rendering or delivery system, or to another facility, such as for use in research and training. The transfer can occur via wireless communication, across a data communication network, or physically by saving the photographs onto a portable computer readable storage device (e.g., a flash drive, compact disc, or digital versatile disc, etc.) and delivering it to the appropriate location. The product rendering or delivery system 144 can be a photography lab where further data processing is performed on the photographs to generate final products. The product rending or delivery system 144 may also be or include a server computing device that receives the photographs. The finished products can be physical products, such as printed photographs, mugs, calendars, and the like, or electronic products, such as digital photographs, digital videos, etc. The finished products can be delivered physically or electronically, such as by transmission from a server computing device across a data communication network, such as the Internet.

Figure 3:
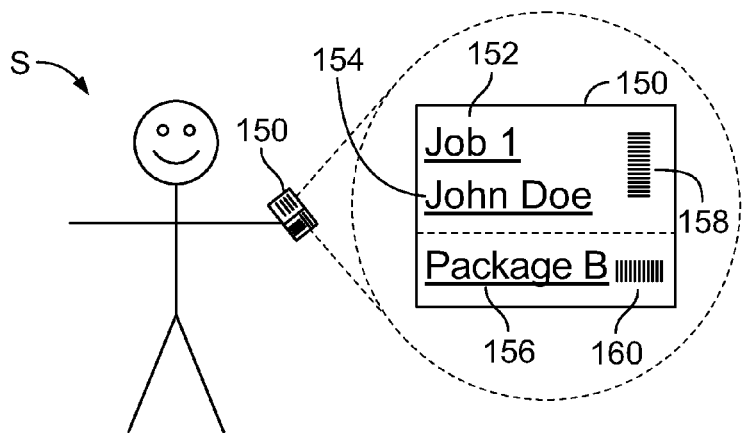
FIG. 3 is a schematic diagram of a subject holding an identification card.
Figure 4:
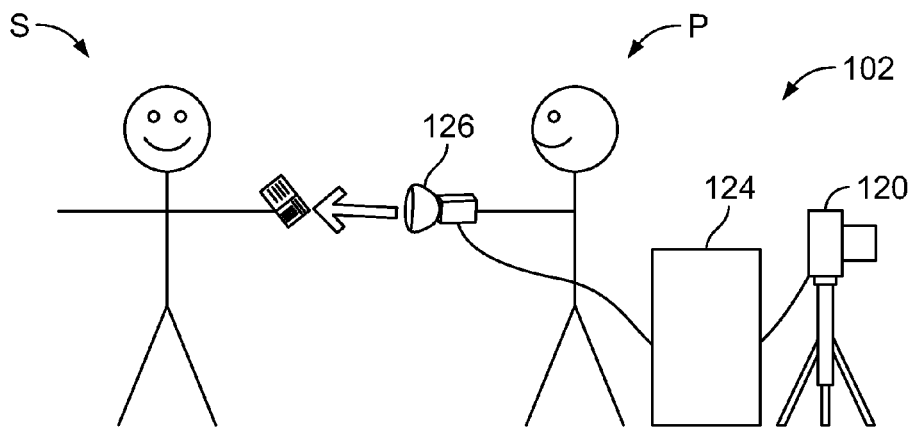
FIG. 4 is a schematic diagram illustrating the use of a subject data input device of the video camera system shown in FIG. 1 to receive data from the identification card shown in FIG. 3.
Figure 5:
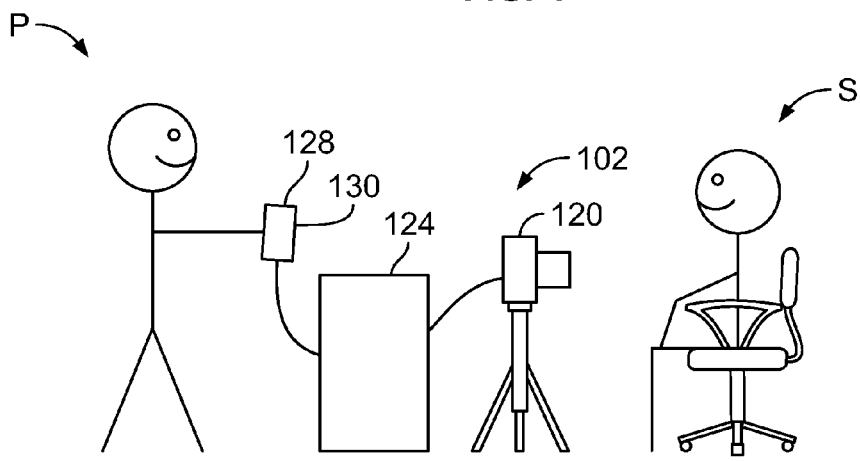
FIG. 5 is a schematic diagram illustrating the use of a handheld control and photographic configuration input device of the video photography system to receive additional input from the photographer.

FIGS. 3-5 illustrate the exemplary operation of several aspects of the video camera system 102, including the operation of the subject data input device 126, the handheld control 128, and the photographic configuration input device 130.

FIG. 3 illustrates a subject S holding a subject identification card 150. In some embodiments, prior to a photography session, the subject S is provided with a subject identification card 150. The subject identification card 150 contains information such as an identifier of the photography session 152 that the subject S is scheduled to participate in, the name of the subject 154, and product order details 156. Some embodiments further include a machine readable code, such as one or more barcodes 158 and 160. The machine readable codes encode data, such as the subject's name, a subject identification number, a product order name or number, or data that can be used to access such information.

FIG. 4 illustrates the use of the subject data input device 126 to receive the subject data from the subject identification card 150. At the start of the photography session, the subject S presents the subject identification card to the photographer P. The photographer P retrieves the information from the subject identification card using the subject data input device 126, such as by scanning one or more barcodes 158 and 160 using a barcode scanner. The data encoded in the barcode is received by the system controller 124 of the video camera system 102, and stored in a computer readable storage device.

In other embodiments, the subject data can be provided to the video camera system in a variety of other ways. For example, in some embodiments the subject data input device 126 includes a keyboard through which the subject data is entered.

In another example embodiment, the subject data is entered prior to a photography session. At the start of the photography session, the photographer P asks the subject S for the subject's name, and then selects the name from a list of names, such as using a touch sensitive display or other input device. In another example embodiment, voice commands are received through a microphone, and voice recognition software is used to decode the instructions and data provided by the photographer or the subject.

FIG. 5 illustrates the use of the handheld control 128 and the photographic configuration input device 130 to receive additional input from the photographer P.

Prior to or during the photography session, the photographic configuration input device 130 operates to receive inputs from the photographer P to adjust the photography mode or various possible operation parameters. For example, in some embodiments the photographer P selects between one or more photography modes, such as a get-it photography mode, a got-it photography mode, and a video replacement photography mode, each of which are described in more detail herein.

In other possible embodiment, the photographic configuration is setup automatically, such as according to business rules and the physical configuration of the video photography system 100. For example, in some embodiments the photographic configuration is automatically determined after the subject identification card is scanned by the subject data input device 126. The subject identification card can identify the photographic configuration, or contain data that can be used to lookup the photographic configuration from a lookup table. Upon receipt of that data with the subject data input device 126, the video photography system 100 adjusts to the appropriate configuration and/or operating mode.

The handheld control 128 is used by the photographer P during the photography session. For example, the handheld control 128 can be used to provide inputs to zoom the video camera 120 in or out, to start or stop video recording, or to identify particular times during the photography session (such as for the get-it and got-it photography modes described in more detail herein). An example of the handheld control 128 is illustrated in FIG. 6.

In another possible embodiment, the handheld control 128 and/or the photographic configuration input device 130 include a microphone. The microphone detects verbal commands spoken by the photographer P or the subject S. A voice recognition module operates to decode the verbal commands and perform methods, operations, or functions associated with the commands.

Figure 6:
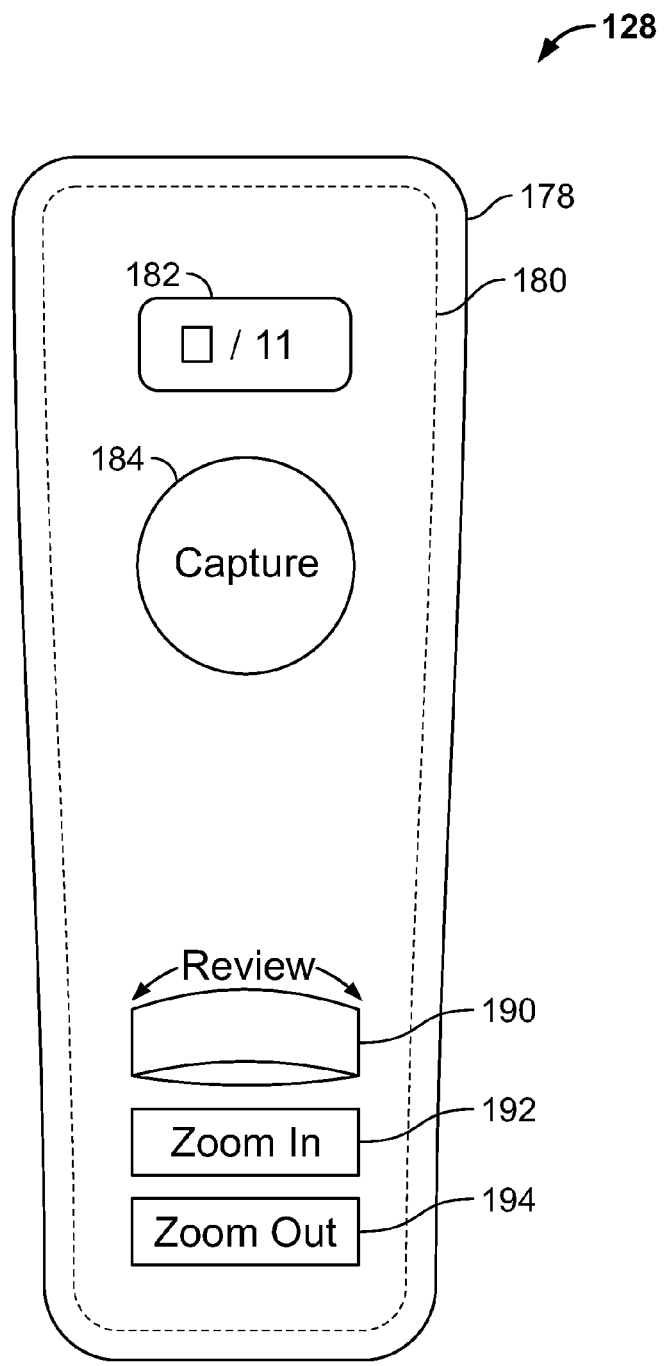
FIG. 6 is a schematic diagram of the example handheld control shown in FIG. 5.

FIG. 6 is a schematic diagram of an example handheld control 128. In this example, the handheld control includes a housing 178, electronic circuitry 180, and a plurality of controls, such as record button 182, capture button 184, review wheel 186, zoom in button 192, and zoom out button 194.

The housing 178 of the handheld control 128 is sized to be held in the hand of the photographer P, and is typically made of molded plastic.

Electronic circuitry 180 is disposed within the housing 178. The electronic circuitry 180 typically includes a battery, button interface circuitry, a processing device, and a radio frequency communication device. The battery stores electrical energy to power the other components of the electronic circuitry. The button interface circuitry receives inputs from the controls, and generates signals detectable by the processing device. The processing device communicates data wirelessly to the system controller 124 using a radio frequency communication device. Alternatively, the handheld control 128 can communicate via a wired connection.

The record button 182 is selected by the photographer P to start or stop video recording, or to indicate the start and stop of a photography session.

The capture button 184 is selected by the photographer P to indicate the occurrence of an event during the photography session. The event may be, for example, a moment in which the subject S had a favorable expression, or a moment prior to the subject's anticipated favorable expression. In some embodiments, the capture button 184 is used to cause the video camera to capture a still photograph. In other embodiments, the capture button 184 is used to identify a frame or group of frames in a video recording.

The review wheel 190 permits the photographer P to provide inputs to more quickly advance through a set of information, such as by turning the review wheel 190 to the left or to the right. For example, the review wheel 190 can be used to quickly scroll through a number of photographs captured during a photography session. The review wheel 190 can also be used, for example, to scroll through a list of subject names in order to identify a name of the next subject to be photographed. In some embodiments the review wheel 190 can be depressed to select a particular item in a set of information.

The zoom in button 192 and zoom out button 194 are used to request that the camera be zoomed in or out. The inputs are used by the system controller 124 to adjust the zoom of the video camera 120.

Figure 7:
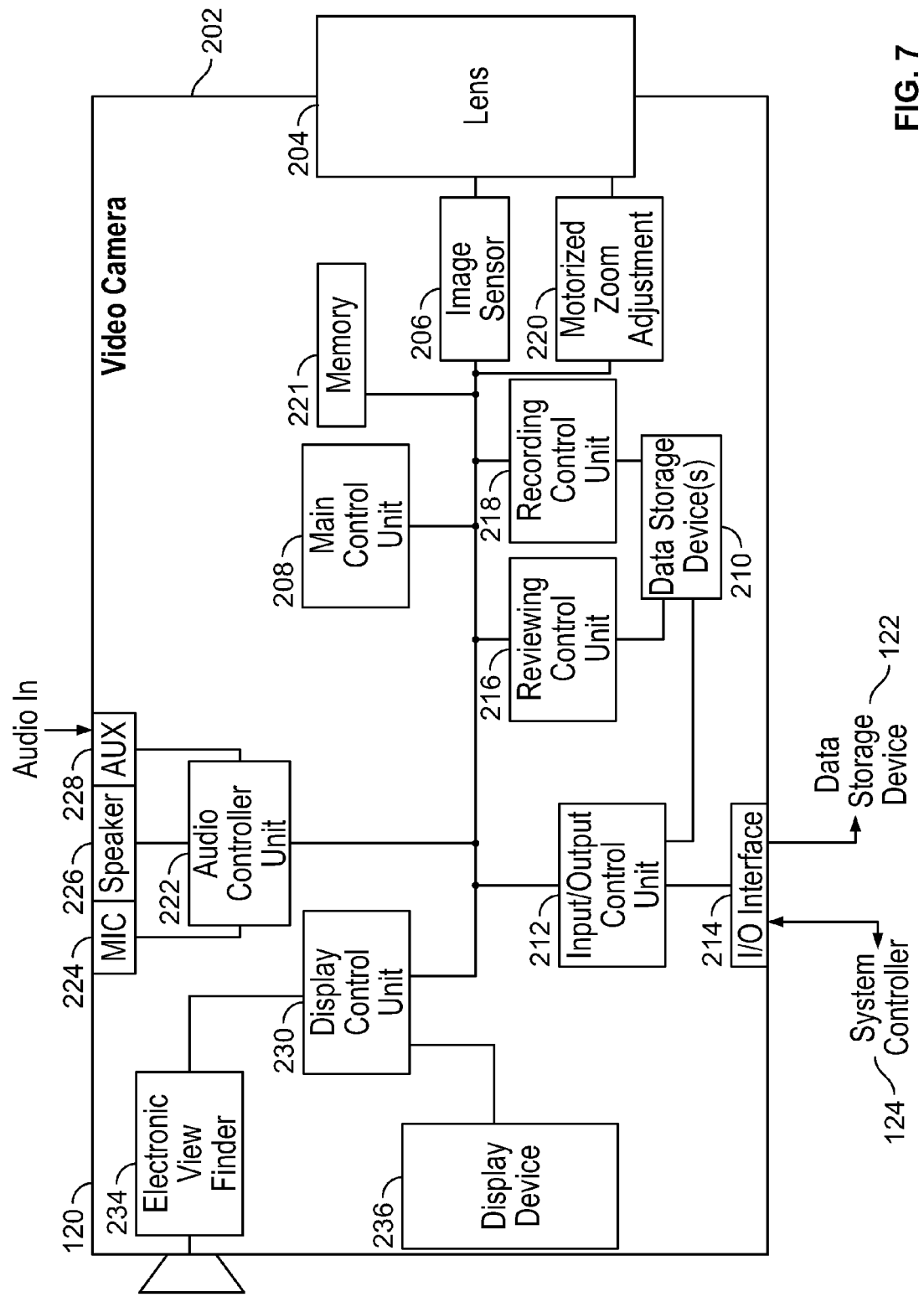
FIG. 7 is a schematic block diagram of an example digital video camera of the video photography system shown in FIG. 1.

FIG. 7 is a schematic block diagram of an example digital video camera 120.

The video camera 120 typically includes at least a housing 202, a lens 204, an image sensor 206, a main control unit 208, one or more data storage devices 210, an input/output control unit 212, and an input/output interface 214. In addition, some embodiments further include one or more of a reviewing control unit 216, recording control unit 218, motorized zoom adjustment device 220, memory 221, audio control unit 222, microphone 224, speaker 226, auxiliary input port 228, display control unit 230, electronic view finder 234, and display device 236.

At least some of the components of the digital camera are enclosed within housing 202, which provides a protective outer casing.

The lens 204 is coupled to and supported by the housing 202. The lens is typically a very high quality lens, which focuses light entering the lens onto the image sensor 206. However, in other embodiments a lower quality lens can alternatively be used.

The image sensor 206 is, for example, a charge-coupled device (CCD) or a complementary metal oxide semiconductor (CMOS) device. The image sensor 206 is configured to capture multiple photographs in rapid succession. The rate in which successive photographs are captured is referred to as the frame rate.

The main control unit 208 controls the overall operation of the video camera 120. The main control unit 208 includes at least a processing device, and typically also includes a memory device, such as one or more of the types of computer-readable storage devices, described herein. In addition, memory 221 can be used to store additional data. In some embodiments, the one or more memory devices store program instructions. When the program instructions are executed by the processing device, the program instructions cause the processing device to perform one or more of the methods, operations, or functions described herein.

Photographs captured by the image sensor 206 are transferred to and stored in one or more data storage devices 210. The data storage devices 210 can be, for example, one or more of the computer-readable storage devices described herein. Additional information or data can also be stored in data storage devices 210, such as audio data, subject data, order data, photographic configuration data, or other data described herein. The audio data encodes audio captured during a photography session, and can include sounds detected by the audio input device 132 (FIG. 2) or audio tones generated by the system controller 124 (also in FIG. 2). In some embodiments, subject data, order data, and/or other data is encoded in at least a portion of the audio data stored in the one or more data storage devices 210.

Storing data in and retrieving data from the one or more data storage devices 210 is performed by the recording control unit 218 and the reviewing control unit 216. In some embodiments, the recording control unit 218 controls the storage of photographs and audio data in the one or more data storage devices 210 during the photography session. In some embodiments, the photographs and audio are stored in the one or more data storage devices 210 in a digital video file format (sometimes alternatively referred to as container or wrapper formats). Examples of digital video file formats include.avi, .mpg, .mp4, .webm, .ogg, and a variety of other possible digital video file formats. Some embodiments utilize or conform to the HTML5 video standard. The reviewing control unit 216 retrieves data from the one or more data storage devices 210 to permit the photographer P to review previously recorded video on the electronic view finder 234 or display device 236.

The input/output control unit 212 manages incoming control signals and generates output signals. The input/output control unit 212 is electrically coupled to the input/output interface, which includes ports where external wires can be connected. In this example, the input/output interface communicates with the system controller 124 and the data storage device 122.

For example, in some embodiments the input/output control unit 212 includes a local application numerical control (LANC), also known as a local application control bus system, capable of receiving control signals and generating sync timing signals. The sync timing signals can be used by the system controller 124, for example, to synchronize background and/or subject lighting systems 104 and 106 with the beginning of each video frame, if desired.

Some embodiments include more than one video camera 120. For example, multiple video cameras 120 can be used to record the subject from different angles. In some embodiments, at least some of the video cameras 120 are configured in a slave mode and controlled by another video camera 120 (or other computing device) operating in a master mode. The video cameras 120 operating in the slave mode are synchronized with the video camera 120 operating in the master mode.

The input/output control unit 212 also operates to transfer data from the one or more data storage devices 210 to data storage device 122, in some embodiments. A variety of data transfer techniques can be used. One example technique utilizes tethered communication across one or more data communication wires. For example a cable is connected between the input/output interface 214 of the video camera and an input/output interface of the video camera system 102 to permit the video camera 120 and the system controller 124 to communicate across the cable. Another example technique involves wireless data transfer. In this example, wireless communication devices are used to communicate between the video camera 120 and the system controller 124. In either case, data transfer can occur as it is recorded (at or near real-time), at the completion of a photography session, or at any one or more times during the photography session. In another example embodiment, data is stored locally on the data storage device 210 of the video camera, which can then be physically removed from the video camera 120 to transfer the data to another device. In this example, the input/output control unit 212 is not used.

The motorized zoom adjustment device 220 is coupled to the lens to adjust the zoom of the lens. For example, when the photographer P selects the zoom in button 192 or the zoom out button 194, the system controller generates appropriate control signals that are provided through the input/output interface 214 to the input/output control unit 212. The control instruction is passed to the main control unit 208, which instructs the motorized zoom adjustment device 220 to adjust the lens accordingly.

The audio control unit 222 is coupled to the audio input and output interface, including the microphone 224, speaker 226, and auxiliary input port 228. The auxiliary input port 228 can be used to receive audio input, such as from the audio input device 132 or the system controller 124, as selected by the audio switch 134 (shown in FIG. 2).

The display control unit 230 generates visible displays at the electronic view finder 234 and the display device 236. For example, the display control unit 230 displays the video as it is being recorded, or can replay video from the data storage device 210 using the reviewing control unit 216.

In some embodiments, the video camera 120 is configured to perform one or more additional functions. Examples of possible additional functions include manual exposure control, pre-record, remote control capability, high resolution capture, and still image capture. Some embodiments include a video camera with video synchronization functions. Examples of these functions include a video frame sync input (such as generator lock, also known as genlock), and video sync output (such as LANC). However, some embodiments do not include such video synchronization functions.

Figure 8:
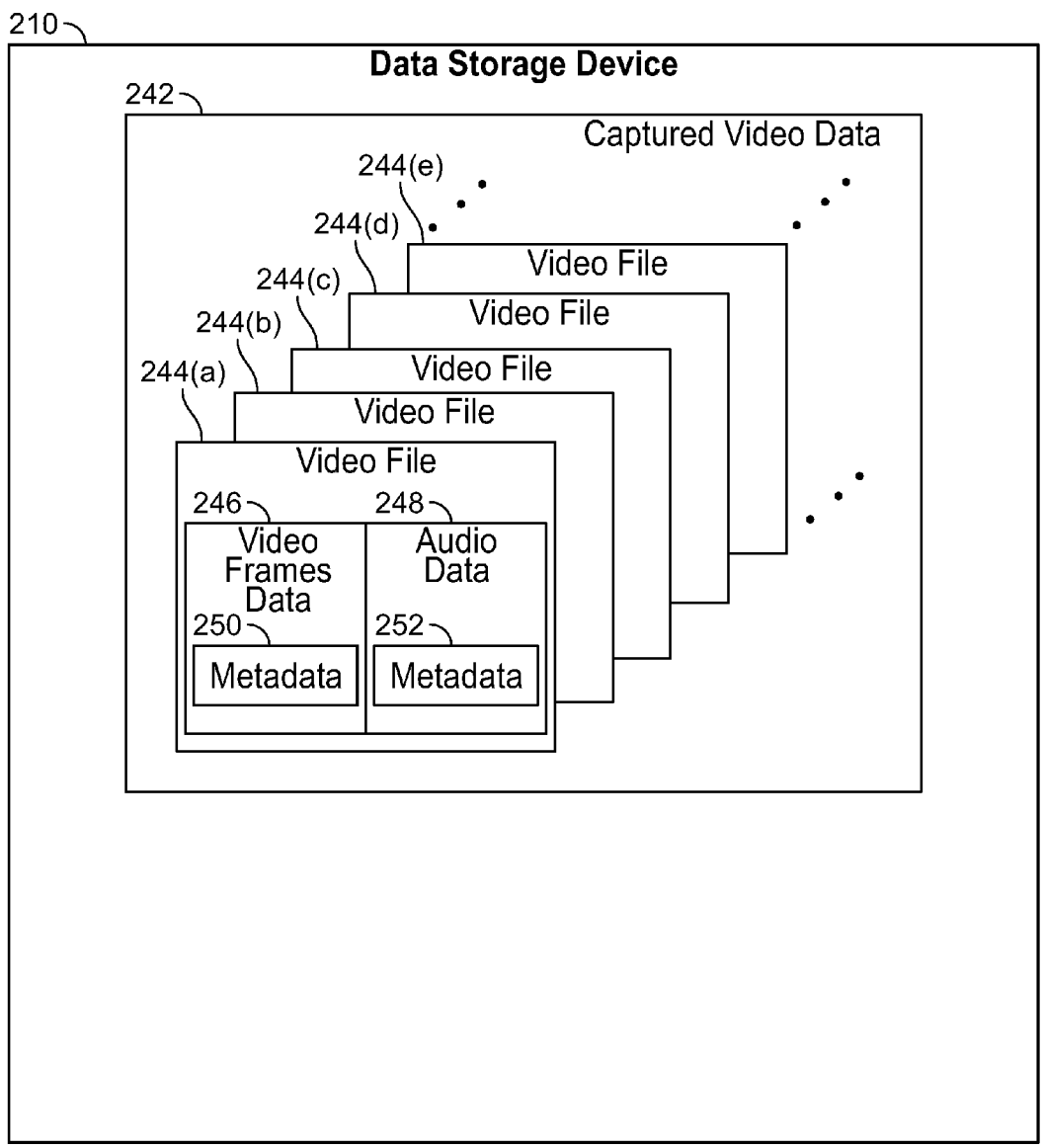
FIG. 8 is a schematic block diagram illustrating an example of a data storage device of the video photography system shown in FIG. 1.

FIG. 8 is a schematic block diagram illustrating the data storage device 122, shown in FIG. 2. In this example, captured video data 242 is stored in one or more of the data storage devices 122. The captured video data 242 includes one or more video files 244 (including, in this example, files 244(a)-(e)).

In some embodiments, the video files 244 include video frames data 246, and can also include audio data 248. The video frames data 246 encodes the photographs captured of one or more subjects. The audio data 248 encodes one or more tracks of audible sounds.

In addition to encoding the photographs and sound, data can also be stored in either the video data 246 or the audio data 246 and 248. This data can be encoded as metadata 250 in the video file, by storing information into one or more metadata fields of the video file 244 or the individual image files, for example. In another example, the data is encoded in metadata 252 of an audio file.

However, other techniques can also be used to encode data in the video file 244, to associate the data with the photographs contained in the video frames data 246. One such technique is to encode the data into one or more audio tracks of the audio data 248 using audible sounds. One exemplary encoding technique is DTMF encoding, though a variety of other encoding techniques could also be used. The data can be encoded into the audio track at the start (or end) of a photography session with each subject S, for example, and the data can therefore be used to identify the subject S that is captured in the video frames data 246.

Similarly, data can also or alternatively be encoded into the backgrounds of photographs captured during the photography session. In one example, the background lighting system 104 encodes data using light sequences to represent the data.

The data can include subject data (such as the name, address, phone number, age, class identifier, teacher name, school name, company name, group affiliations, or other information about the subject S), job data (such as the type of photography session that has been purchased, the photography mode that is desired, the products that have been ordered or purchased, a name of a school or company where the photography session is occurring, a purchase order number, a quantity of products purchased, etc.), photography data (e.g., photography mode that was used, color or lighting characteristics, photographic enhancements to be applied, etc.), or any other data that is useful to associate with the video files 244.

Figure 9:
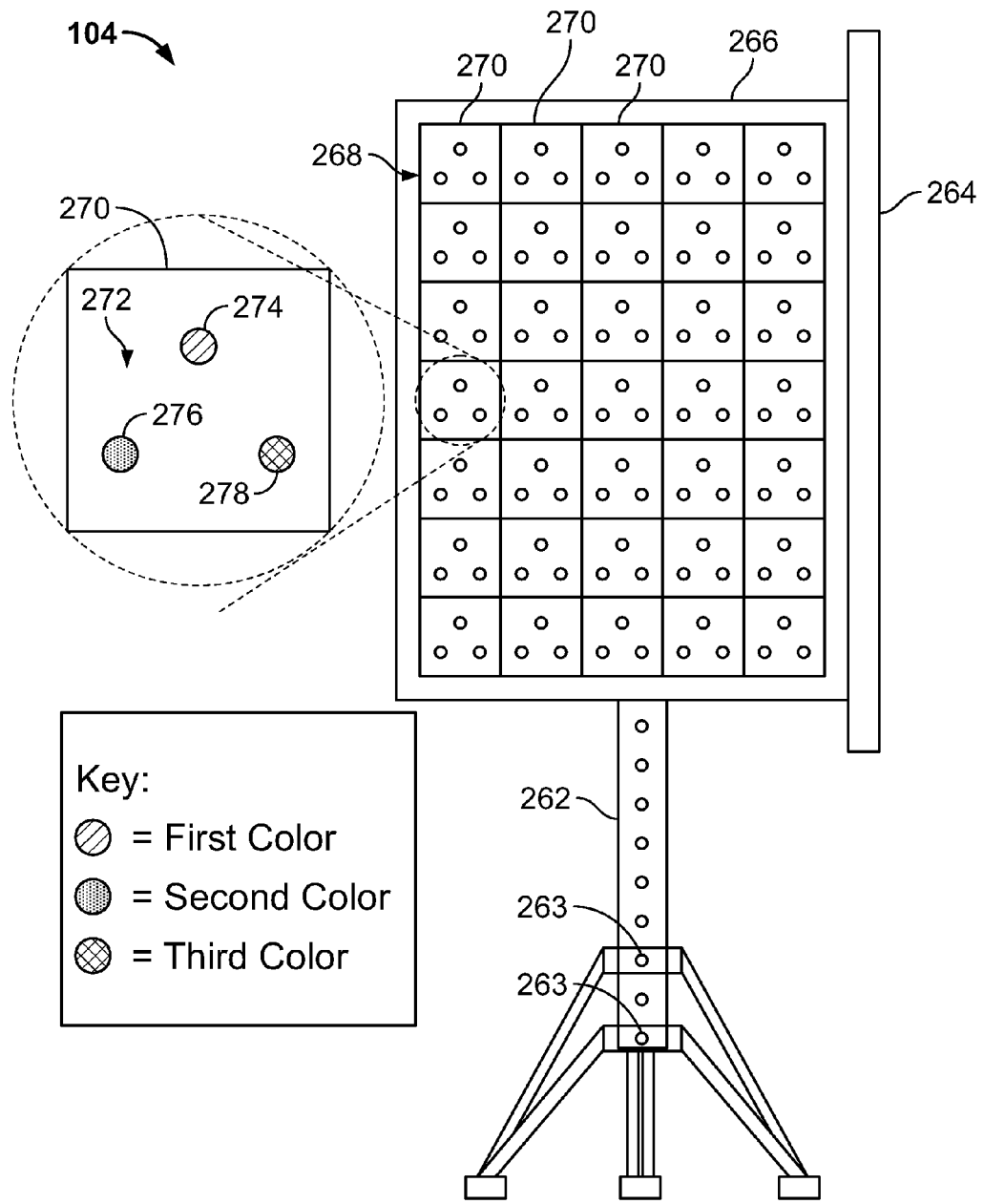
FIG. 9 is a schematic front view of an example of a background lighting system of the video photography system shown in FIG. 1.

FIGS. 9-10 illustrate an example of the background lighting system 104, shown in FIG. 1.

FIG. 9 is a schematic front view of an example of the background lighting system 104. In this example, the background lighting system 104 includes a stand 262, a light shield 264, and a lighting module 266. The example background lighting system 104 is illustrated in FIG. 9 without a light modifier so that additional details are visible.

The stand 262 elevates and supports the light shield 264 and lighting module 266 at an appropriate location relative to the background 112, the subject S, and the video camera system 102 (FIG. 1). An example of a stand 262 is a tripod. Other embodiments have other configurations. In some embodiments, the stand 262 is adjustable to permit the photographer P to adjust the elevation of the lighting module 266 above the floor to appropriately illuminate the background 112. In this example, the stand includes one or more spring buttons 263 that are each configured to engage with one of a plurality of spaced apertures arranged along the shaft of the stand 262.

The light shield 264 is provided on one side of the background lighting system 104 and operates to block light emitted from the lighting module 266 from directly illuminating the subject S. Accordingly, the light shield is typically made of an opaque material, such as a cardboard, paperboard, wood, plastic, metal, fabric, or other suitable materials. A face of the light shield 264 can be painted or otherwise colored with a neutral or dark color with a flat finish or textured surface to reduce undesired reflection of light from the subject lighting system 106 (FIG. 1) onto the subject S or toward the video camera system 102.

The lighting module 266 operates to generate light to illuminate the background 112. In this example, the lighting module 266 includes a light source array 268. The light source array 268 includes a plurality of LED modules 270 arranged in a repeating pattern, such as arranged in a plurality of rows and columns. In another possible embodiment, the lighting module 266 includes one or more LED modules 270, with one or more LEDs. Yet another embodiment of the lighting module 266 includes no LED modules 270, but does include one or more LEDs 272.

In some embodiments, the LED modules 270 include a printed circuit board and at least one LED 272. The printed circuit board contains conductive traces electrically coupled to the at least one LED 272. In some embodiments the LED modules 270 each include separate circuit boards, while in other embodiments all of the LED modules 270 are formed on a single, or several, circuit boards. In yet other embodiments, another support structure is used other than, or in addition to, the circuit board.

Any number of LED modules 270 can be used from 1 to 100, several hundred, or even 1000 or more. The appropriate number of LED modules 270 used can be determined based on the amount of light needed to adequately illuminate the background 112, divided by the intensity of the lighting modules 266. In this example, the lighting module 266 includes seven rows and five columns of LED modules 270, for a total of 35 LED modules 270. Other embodiments include a total in a range from about 9 to about 120 LED modules.

In some embodiments, the LED modules 270 are collectively arranged in a rectangular shape, as shown in FIG. 9. In other embodiments, the LED modules 270 are collectively arranged in a substantially square shape. In some embodiments, the LED modules are collectively arranged in a shape similar to the shape of background 112. In yet another embodiment, the LED modules 270 are collectively arranged into a substantially hexagonal, circular, or elliptical shape.

Each LED module 270 includes one or more LEDs 272. In the illustrated example, each LED module 270 includes three LEDs 272. In some embodiments, each of the LEDs emits light having different wavelengths. For example, the LEDs 272 include an LED 274 of a first color, an LED 276 of a second color, and an LED 278 of a third color. As one example, the first color is red, the second color is green, and the third color is blue. Other embodiments include one or more LEDs 272 having only a single color, while other embodiments include two or more different LEDs providing two more different colors. In another possible embodiment, a single LED can generate two or more different colors. Further, multiple lighting conditions can be generated by various combinations of two or more colors from one or multiple LEDs. In yet another embodiment, various lighting conditions can be generated using different light levels of a single or multiple colors. Although this example refers to LEDs, other light sources can be used in other embodiments.

The LEDs 272 can be arranged in a variety of different patterns on each LED module 270, and the patterns need not be the same on each LED module 270. In the illustrated example, the LEDs 272 are arranged in a triangular pattern. The LEDs could also be arranged in a linear pattern, in an alternating pattern, or in a variety of other possible patterns. It is desirable for the LEDs 272 to be arranged in such a pattern that the LEDs 272 illuminate the background 112 relatively evenly.

In some embodiments, the LEDs 272 generates light having wavelengths in the following ranges, although other embodiments have other wavelengths. The red LED 274 generates light having wavelengths in a range from about 610 nm to about 760 nm. The green LED 276 generates light having wavelengths in a range from about 500 nm to about 570 nm. The blue LED generates light having wavelengths in a range from about 450 nm to about 500 nm.

LEDs 272 are typically formed of one or more semiconductor materials. Examples of suitable red LEDs 274 include aluminium gallium arsenide (AlGaAs), gallium arsenide phosphide (GaAsP), aluminium gallium indium phosphide (AlGaInP), and gallium(III) phosphide (GaP). Examples of suitable green LEDs 276 include indium gallium nitride (InGaN), gallium(III) nitride (GaN), gallium(III) phosphide (GaP), aluminium gallium indium phosphide (AlGaInP), and aluminium gallium phosphide (AlGaP). Examples of suitable blue LEDs include zinc selenide (ZnSe), indium gallium nitride (InGaN), and silicon carbide (SiC). Other embodiments include LEDs 272 formed of other materials.

The LEDs 272 are preferably the high-brightness variety, such as providing a light intensity of greater than about 0.5, 1, 1.5, 2, 5, 10, 20, or 50 millicandelas (mcd). Some embodiments include LEDs 272 having a light intensity in a range from about 0.5 candelas (cd) to about 100 cd. Some embodiments utilize LEDs 272 having light intensities in a range from about 10 candelas to about 50 candelas.

As noted herein, other light sources other than LEDs 272 can also or alternatively be used in other embodiments. Light sources will typically be selected to have one or more of the following characteristics for various possible embodiments: long life, high light output, highly efficient (low power consumption), selectable light spectra (nominal wavelength and wavelength deviation), fast reaction time (full off to full on and full on to full off in microseconds, such as less than 100, 20, 10, 5, or 1 microseconds), configured to be precisely controlled with electronic circuitry, and modular. In another possible embodiment, a shutter or other device configured to selectively pass or block light from the light source can be used to quickly adjust the light source between the full on and full off states in embodiments in which the light source itself has an undesirably slow reaction time.

FIG. 10 is a schematic block diagram of an example lighting module 266 of the background lighting system 104. In this example, the lighting module 266 includes LED drive 290, light source array 268, and light modifier 292.

In some embodiments, the LED drive 290 includes a power supply 302, LED drive controller 304, and drive circuitry 306.

The power supply 302 typically received power from an external power source, such as a wall receptacle. A power cord is provided in some embodiments to deliver power from the wall receptacle to the power supply 302. In other embodiments, the power supply 302 includes a battery power source. The power supply 302 filters and transforms the power into the form required to power the LED drive controller 304, drive circuitry 306, and other components of the lighting module 266.

The LED drive controller 304 controls the operation of the lighting module 266, and in some embodiments receives inputs from the output 136 of video camera system 102. The inputs received from the video camera system 102 can include, for example, operational mode settings, synchronization signals, and requests to initiate a background lighting operation.

The LED drive controller 304 typically includes a processing device, such as one of the types of processing devices described herein. In some embodiments the LED drive controller 304 further includes memory, such as one of the computer-readable storage devices also described herein. In some embodiments, the memory stores data instructions that can be executed by the processing device to cause the processing device to perform one or more of the methods, operations, or functions described herein, such as the background lighting operations.

The drive circuitry 306 is controlled by the LED drive controller 304 and operates to provide power to the light source array 268 to illuminate one or more of the LEDs 272 (FIG. 9). In some embodiments, the drive circuitry 306 operates to switch LEDs 272 on or off, such as by selectively providing a suitable current to the LEDs 272 to turn the LEDs 272 on, and then selectively removing the current to turn the LEDs 272 off. In some embodiments, the brightness can be adjusted by selectively turning on only some of the LEDs at a given time. For example, half of the LEDs 272 can be illuminated for half brightness, and all of the LEDs 272 can be illuminated for full brightness.

In other embodiments, the drive circuitry 306 operates to provide a variable brightness by adjusting the amount of power delivered to the LEDs. Various techniques can be used to provide a variable power, such as by providing a variable current to the LEDs 272. For example, the current can be adjusted between a high current and a low current to adjust the brightness of the LEDs 272. Analog power shaping or pulse width modulation can alternatively be used to adjust the power delivered to the LEDs 272.

The light source array 268 includes one or more LEDs 272. The LEDs 272 generate light when powered by the drive circuitry 306. In some embodiments, the LED modules 270 and/or individual LEDs 272 are individually addressed or controlled, so that individual LEDs can be turned on and off as desired. In other embodiments, at least some of the LEDs 272 are operated as a group. For example, all of the LEDs 274 are operated as a first group, all of the LEDs 276 are operated as a second group, and all of the LEDS 278 are operated as a third group, in some embodiments.

The light modifier 292 is provided to filter and/or distribute light generated by the lighting module 266. Many types of LEDs have a relatively narrow light distribution angle. A light modifier 292 is provided in some embodiments to distribute the light and widen the light distribution angle. Examples of light modifiers 292 include a lens, a collar, an umbrella, a softbox, and the like. The wider light distribution angle permits the lighting module 266 to be positioned closer to the background 112, while maintaining an adequate distribution of light across the background 112. The light modifier 292 is also provided to soften, filter, or diffuse light generated by the lighting module 266, in some embodiments. The light modifier 292 also operates as a protective enclosure for the light source array 268 in some embodiments. However, in some embodiments the modification of light from light source array 268 is not needed, and such embodiments do not include light modifier 292.

Figure 11:
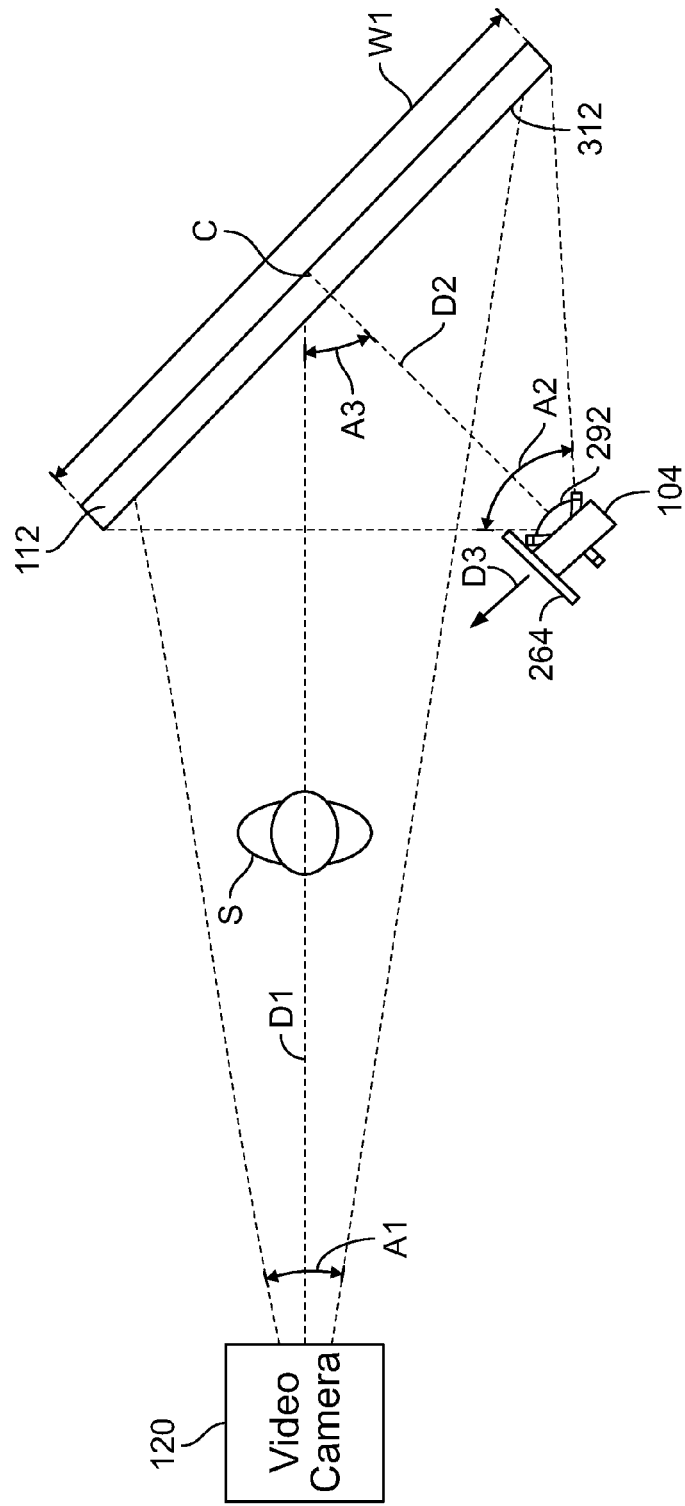
FIG. 11 is a top plan view of a portion of the video photography system shown in FIG. 1, illustrating an exemplary arrangement of the background lighting system relative to the video camera, the subject, and the background.

FIG. 11 is a top plan view of a portion of the video photography system 100, illustrating an exemplary arrangement of the background lighting system 104 relative to the video camera 120, subject S, and background 112.

The video camera 120 is arranged in a direction D1, which is typically generally aligned with a center C of the background 112. The video camera has an angle of view A1, and the background 112 is typically positioned so that the entire angle of view A1 is encompassed by the background 112. During a photography session, the subject S is positioned generally along direction D1, between the video camera 120 and the background 112.

The background lighting system 104 is positioned outside of the angle of view A1 of the video camera 120 so that it is not visible in the photographs taken by the video camera 120. The background lighting system 104 is typically generally aligned in a direction D2 substantially normal to an exterior surface 312 of background 112, so that the background lighting system 104 and the background 112 face each other.

The background lighting system 104 has a distribution angle A2 (after modification by the light modifier 292). The background lighting system 104 is typically positioned a distance away from the background 112 so that it is out of the angle of view A1 of the video camera and so that it fully illuminates the extent of the background 112. In some embodiments, due to the widened distribution angle A2, the background lighting system 104 can be positioned much closer to the background 112 than if a light modifier 292 were not used.

The background is preferably arranged so that it faces at an angle A3 to the direction D1 of the video camera. The angle A3 is typically in a range from about 30 degrees to about 60 degrees, and preferably in a range from about 40 to about 50 degrees, or about 45 degrees. When arranged at this angle A3, light from the background lighting system 104 can be distributed across the background 112 relatively evenly. In addition, most light from the background lighting system 104 that is reflected off of the exterior 312 of background 112 will be directed back generally in the direction D2, rather than in the direction D1 toward the video camera, further improving the distribution of light across the background as detected by the video camera 120, and reducing or eliminating localized regions of higher light intensity on the background 112.

Using techniques described herein, the size of the background 112 can be reduced in some embodiments. In this example, the background has a height H1 (not visible in FIG. 11) and a width W1. The height H1 and width W1 are large enough to encompass the entire angle of view A1 when placed the desired distance away from video camera 120 (which must be greater than the distance from the video camera 120 to the subject S) and when arranged at the angle A3 to the video camera 120.

The background 112 can have a variety of different sizes depending on the size of the subject S or group of subjects. As one example, when the subject S is a single individual being photographed from close up to ½ length, the background can have a height H1 in a range from about 6 feet to about 7.5 feet, and preferably about 7 feet, and a width W1 in a range from about 5 feet to about 7 feet, and preferably about 6 feet. Some embodiments include a background 112 having a height H1 of less than 7 feet (or less than about 7 feet), and a width less than 6 feet (or less than about 6 feet). As described in more detail with reference to FIG. 12, the size of the background does not limit the size or aspect ratio of final products that can be generated from the captured photograph. Other embodiments have a background 112 with other dimensions. Yet further embodiments utilize another object as the background, such as a wall, a curtain, a door, or the like.

Figure 12:
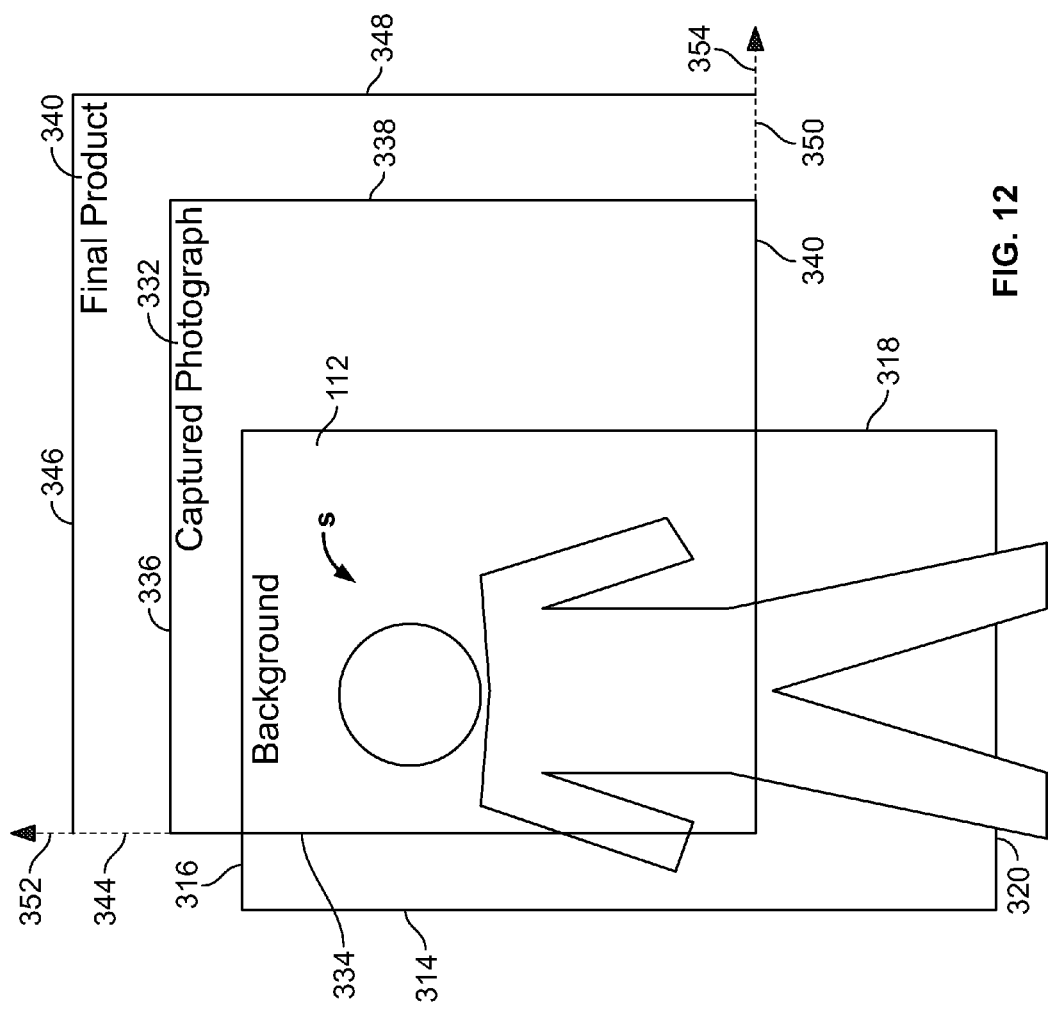
FIG. 12 is a schematic block diagram of a subject standing in front of a background.

FIG. 12 is a schematic block diagram of a subject S standing in front of a background 112. The background has edges 314, 316, 318, and 320. FIG. 12 also illustrates an example photograph 332 and final product 340 that can be made from the photograph 332, by utilizing background replacement techniques described herein.

In this example, the background 112 is larger than the subject S, so that the majority of the subject S is surrounded by a portion of the background 112. In other embodiments, however, the background can be sized to be smaller than at least one dimension of a subject S (e.g., height or width), if desired.

The photography system 100 can operate to capture a photograph of the subject S so that the outer bounds 334, 336, 338, and 340 of the photograph 332 are within the edges 314, 316, 318, and 320 of the background.

However, the photography system 100 can also operate to capture a photograph 332, as illustrated in FIG. 12, in which the outer bounds of the photograph extend beyond at least some of the edges 316 and 318 of the background 112. In this example, edges 316 and 318 are visible in the photograph 332.

In this example, the video camera 120 (FIG. 11) has been positioned and zoomed so that the subject S is partially cropped. More specifically, the outer boundary 334 of the photograph 332 has cut off a portion of the right side of the subject S, and the outer boundary 340 has cut off the lower portion of the subject S. The left side of the subject S and the top of the subject S, however, are entirely within the bounds of the captured photograph 332.

Background identification and replacement techniques can be used to distinguish portions of the captured photograph 332 that include the subject S from portions of the captured photograph 332 that are background 112 or even beyond the background 112. Once identified, any portion of the captured photograph 332 that does not include the subject S can be replaced by other background images having different (or the same) sizes or aspect ratios.

The final product 340 illustrates the aspect ratio and content of a photograph that can be generated from the captured photograph 332. The final product 340 has outer bounds 344, 346, 348, and 350. As shown in FIG. 12, the outer bounds of the final product 340 are not limited by the edges 316 and 318 of background 112, or by outer bounds 336 and 338 of the captured photograph 332. Instead, the outer bounds 350 of the final product 340 can extend beyond the edges of background 112 and outer bounds of the captured photograph 332.

Arrows 352 and 354 graphically illustrate that the outer bounds 346 and 348 of the final product 340 can be expanded upward and to the right without limitation. Expansion is only limited in the left and downward directions due to the cropping of the right side and lower portion of the subject S in the captured photograph 332. If the subject S had not been cropped in one or both of these directions, expansion of outer bounds 344 and 350 of final product 340 to the left or downward would also be possible.

In some embodiments, the video photography system 100 is more compact than conventional photography stations. Some embodiments of the video photography system 100 are portable and compact. For example, a smaller background 112 can be used that need not encompass the entire view angle of the video camera 120. The size and aspect ratio of final products are not limited by the use of smaller backgrounds. In another possible embodiment, the background can be another object, such that the photographer P does not need to bring or transport a background 112 at all.

Figure 13:
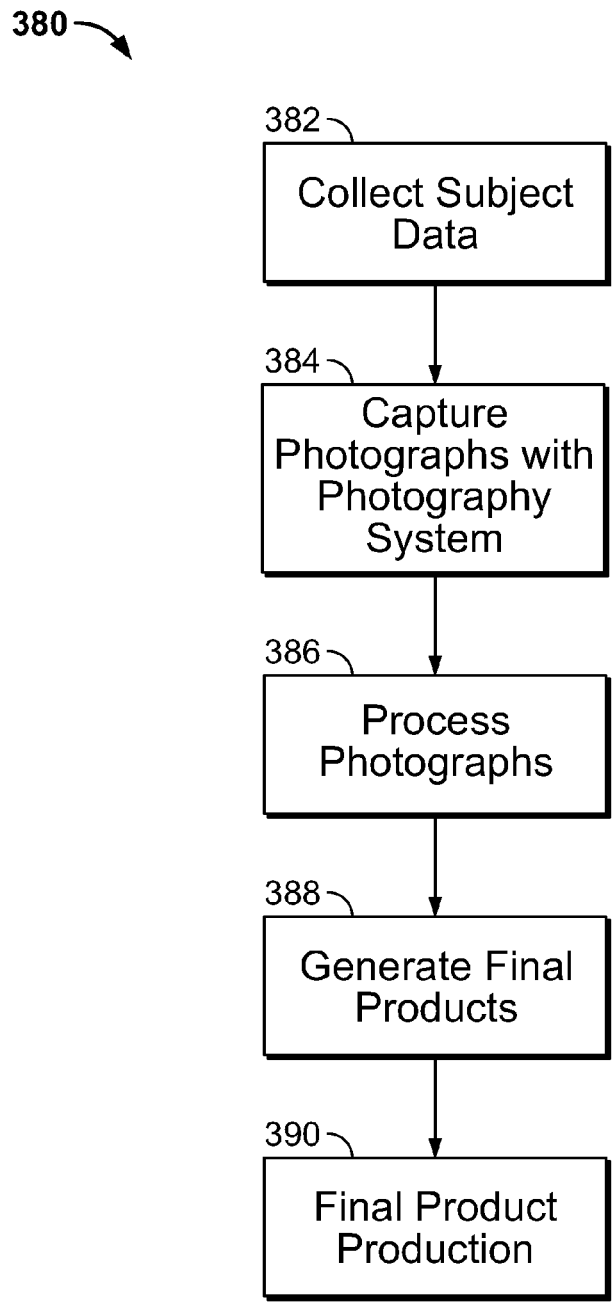
FIG. 13 is a flow chart illustrating a method of making photographic products.

FIG. 13 is a flow chart illustrating a method 380 of making photographic products. In this example, the method 380 includes operations 382, 384, 386, 388, and 390.

Operation 382 is performed to collect subject data or other data associated with a photography session. In some embodiments the subject data is collected using the subject data input device 126, such as illustrated and described in more detail with reference to FIGS. 3-5 herein. The subject data can also be manually input or otherwise provided by the subject S or the photographer P. The data can be received before, during, or after the photography session, and need not occur in the order depicted in FIG. 13.

Operation 382 can be performed by the photography system 100 (FIG. 1) or by another computing device. If performed by another computing device, the subject data is typically provided to the photography system so that the subject data can be stored in association with the photographs, as described herein.

Operation 384 is performed to capture one or more photographs of the subject S using the photography system 100 (FIG. 1).

In some embodiments, the photography system 100 can be operated in a variety of different modes. Examples of these photography modes include the "Got It" photography mode, the "Get It" photography mode, and the "Video Replacement" photography mode. The Got It photography mode is illustrated and described in more detail herein with reference to FIGS. 14-16. The Get It photography mode is illustrated and described in more detail herein with reference to FIGS. 17-18. The Video Replacement photography mode is illustrated and described in more detail with reference to FIGS. 19-23. In all of these modes, one or more photographs of the subject S are captured by the video camera system 102.

Following the capture of one or more photographs, operation 386 is performed to process the photographs. Operation 386 can include data culling, for example, to reduce the total number of photographs. When capturing photographs with a video camera, a large number of photographs can be captured. In some embodiments it is desirable to reduce the number of photographs that will be saved and discard the rest. The reduction can be accomplished in a number of ways.

If the desired final product is a still image product, and due to the high similarity between sequentially captured photographs, it may be suitable to save only a fraction of the photographs, such as every other photograph, every fourth photograph, every eighth photograph, every sixteenth photograph, etc.

Even if the final product is a video product, however, it may still be suitable to discard a fraction of the photographs, particularly if the frame rate of the video camera is greater than the frame rate needed for the final product.

In addition, in some embodiments it is possible to identify photographs that have a greater likelihood of containing a desired expression than other photographs. For example, photographs that were captured within a predetermined range of time before and/or after a photographer's capture input (indicative of the photographer's intent to capture a particular photograph or range of photographs) can be determined to be more likely to contain a desired expression than photographs that were captured outside of the predetermined range of time. Those photographs that were captured outside of the predetermined range are discarded in some embodiments; or a larger proportion of those photographs can be discarded.

In some embodiments, after capturing photographs the photographer P uses the review wheel 190 (FIG. 6) to quickly scroll through the photographs that were taken and review the photographs and associated expressions. The photographer P can identify photographs that contain good expressions, such as by selecting the capture button when the photograph is displayed. The information is then stored in association with the photographs. This information can then be used to automatically reduce the total number of photographs that are stored, such as by discarding photographs that are not tagged by the photographer P, or photographs that are not within a predetermined range of tagged photographs.

The photographer's intent can be encoded within either the photographs themselves (such as by encoding in metadata or by modulating the background lighting to encode the data), within the audio channel (such as by using DTMF or other tones to encode the data), or as separate data (e.g., a timestamp) stored in the computer readable storage device, as described in more detail herein.

When background details from captured photographs are not needed, the subject S can be separated from the background using the techniques described herein, such that the background data is discarded.

Additional editing of photographs can also be performed during operation 386, such as to adjust colors, brightness, balance, hue, saturation, or other digital enhancements, effects, or corrections. In addition, facial recognition techniques are also used in some embodiments.

Some or all of operation 386 can be performed by the photography system 100 or by one or more separate computing devices. When a separate computing device is used, data is transferred from the photography system 100 to the computing device for processing. The data can be transferred on a physical computer readable storage device, such as a CD ROM, flash drive, hard disk drive, and the like; or by wired or wireless data transmission. Data transmission can occur, for example, across a local area network or other data communication network, such as the Internet. The data transmission can involve Ethernet communication, Wi-Fi wireless communication, or cellular communication (e.g., 3G or 4G), for example.

Operation 388 is performed to generate final products. A wide variety of final products can be made from the photographs captured by the photography system 100, shown in FIG. 1. These products can include still image products as well as video products. The video products include a plurality of photographs, and in some embodiments video products also include audio. Some of these products may require further modification to the original image in order to be suitable for the final product production operation 390. Examples of such modifications include size adjustment, aspect ratio adjustment, cropping, and further digital editing or processing. In addition, operation 388 can include the final selection of one or more photographs from multiple possible photographs to be used in the final product. In some embodiments facial recognition software is used to automatically evaluate facial expressions and provide a facial expression score for each possible photograph, where the photograph(s) with the highest score(s) are selected for use in the final product or products. In some embodiments, selection of the photographs is done by the photographer P, a lab technician, the subject S, or a customer.

In some embodiments, generation of the final product can include the replacement of an original background in a photograph with another background art image. An example of the background replacement process is illustrated and described in more detail with reference to FIGS. 19-23.

Some or all of operation 388 can be performed by the photography system 100 or one or more separate computing devices. If a separate computing device is used, the data can be transferred to the separate computing device, such as using one of the data transfer technologies described herein.

Operation 390 is performed to produce the final products. Once the digital photographs have been generated in the appropriate form, operation 390 proceeds to produce the final products. Production can include, for example, printing still images on photographic paper, screen printing onto an object (e.g., a coffee mug, a shirt, etc.), storing digital photographs onto a computer readable storage device, electronically distributing across a network (such as the Internet), etc. Examples of electronic distribution include e-mail distribution, multimedia messaging service (MMS) distribution, transmission through web pages provided by a Web server, etc.

Figure 14:
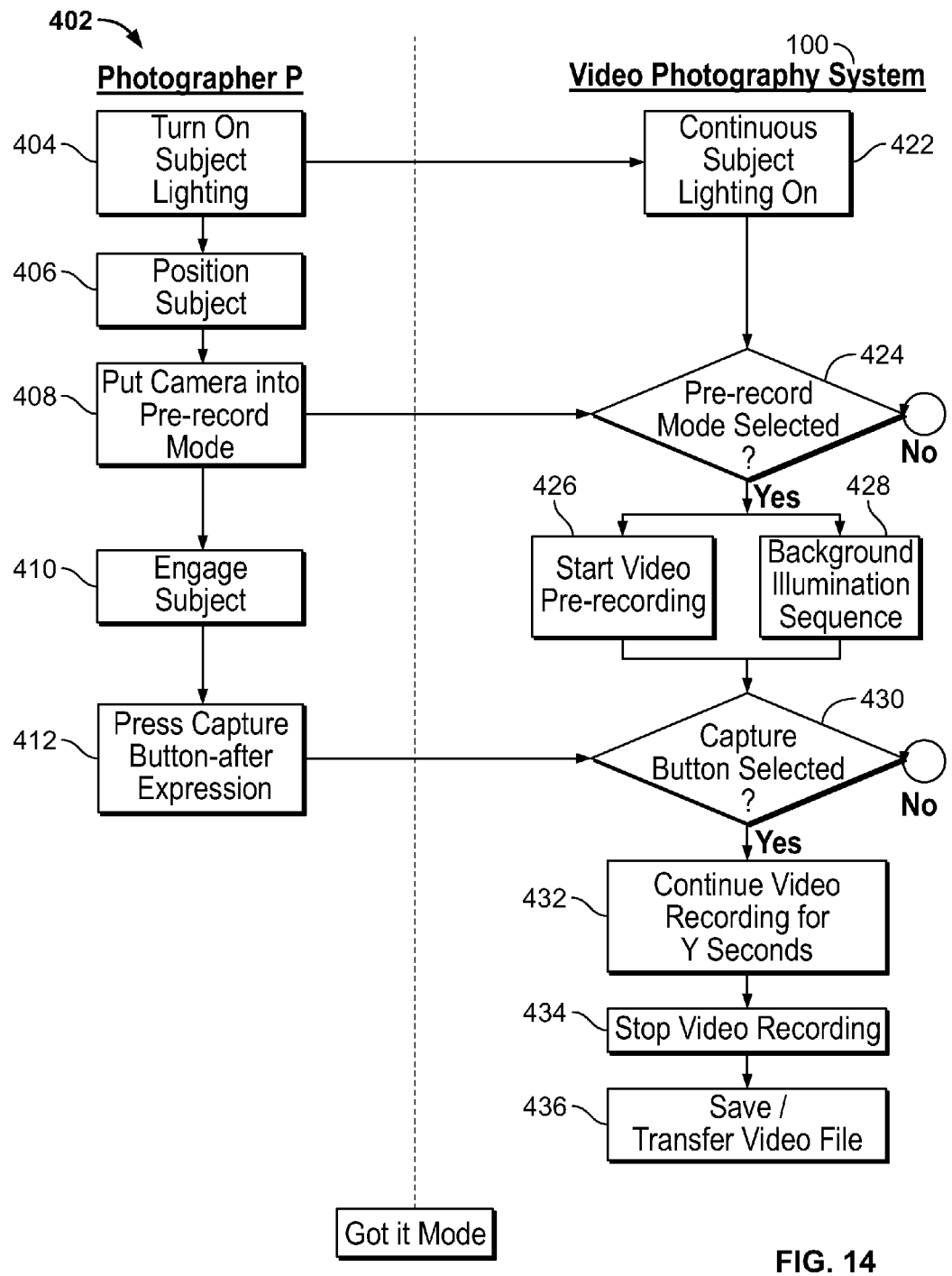
FIG. 14 is a flow chart illustrating a method of operating the video photography system shown in FIG. 1 in the "Got it" photography mode.
Figure 15:
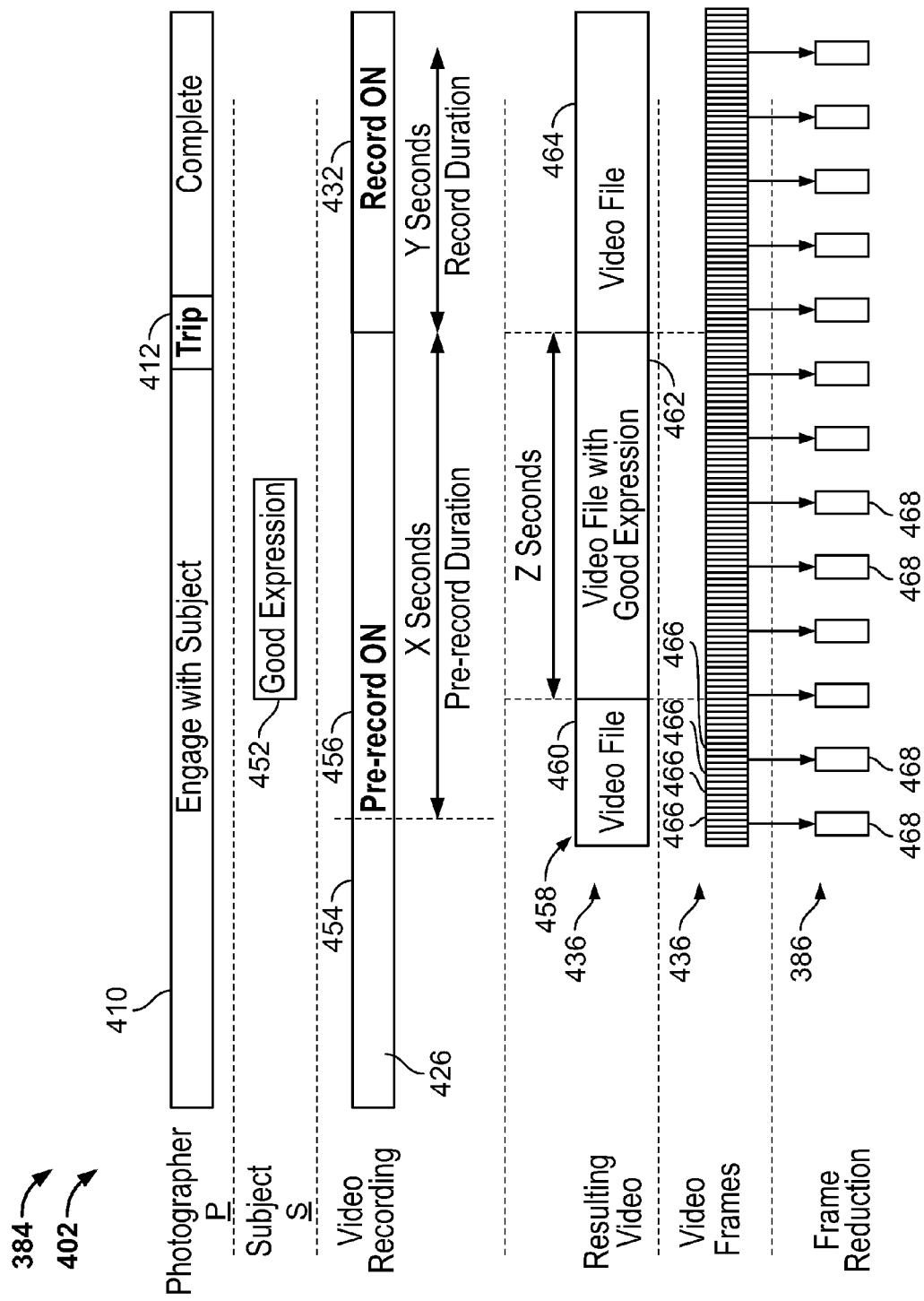
FIG. 15 is a timing diagram illustrating further exemplary details of the operation of the video photography system when operating in the "Got it" photography mode.
Figure 16:
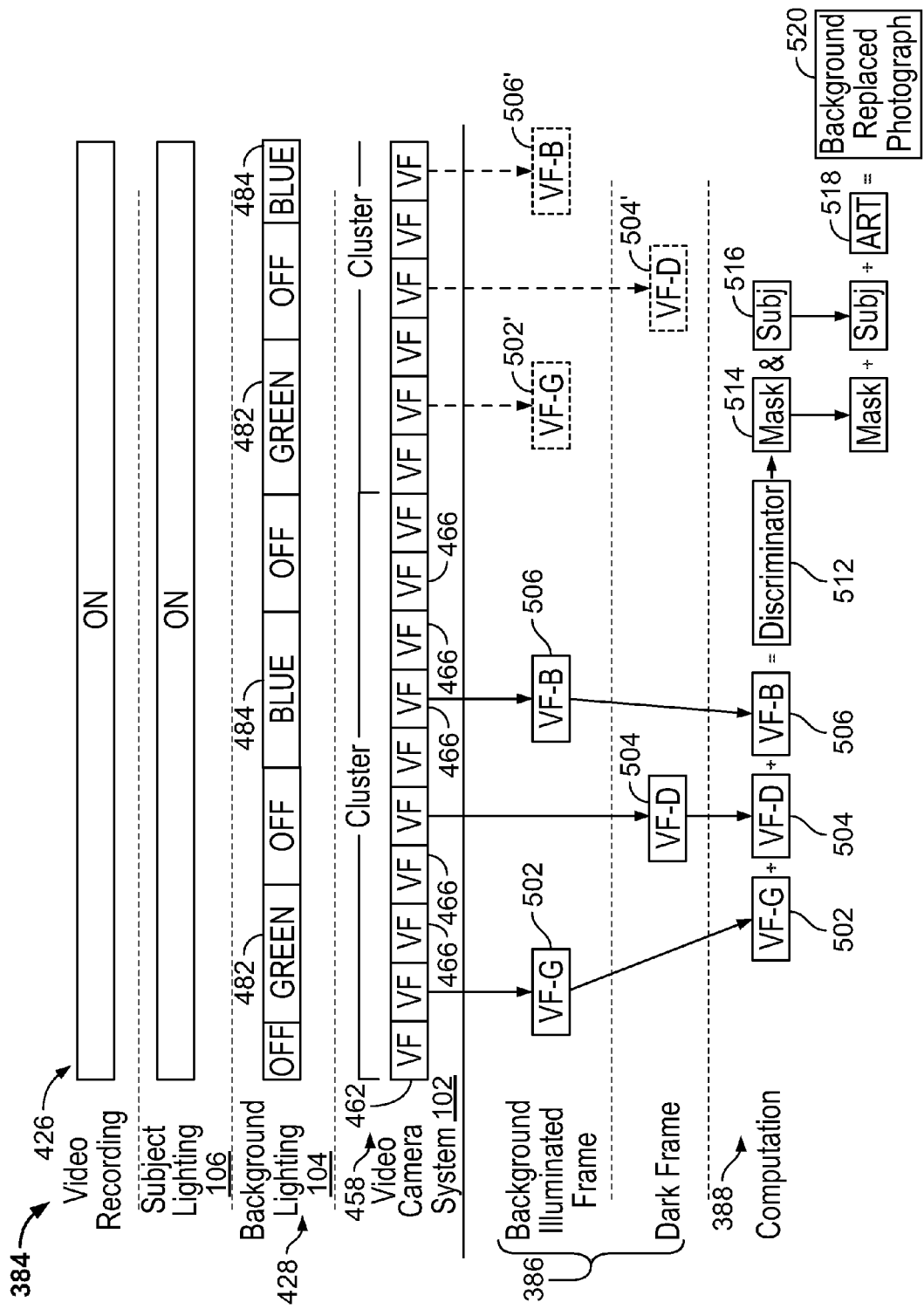
FIG. 16 is a timing diagram illustrating further exemplary details of the operation of the video photography system when operating in the "Got it" photography mode.

FIGS. 14-16 illustrate an exemplary method of operating the video photography system 100 (FIG. 1). In this example, the video photography system 100 is referred to as operating in a "Got it" photography mode. FIGS. 14-16 also illustrate an example of operation 384, shown in FIG. 13, for capturing photographs with the photography system 100.

FIG. 14 is a flow chart illustrating a method 402 of operating the video photography system 100 in the Got it photography mode. In this example, the method includes operations performed by a photographer P (or other person) and operations performed by the video photography system 100. More specifically, in this example the photographer P performs operations 404, 406, 408, 410, and 412; and the video photography system 100 performs operations 422, 424, 426, 428, 430, 432, 434, and 436.

Operations 404 and 422 are performed to turn on the subject (foreground) lighting. In some embodiments, the photography system 100 includes subject lighting system 106 (FIG. 1) that operates to provide continuous lighting, rather than flash lighting, to illuminate the subject S. The continuous lighting provides a more pleasant photography environment, for example, by eliminating sudden flashes of light on the subject S that could otherwise make the subject S feel startled or uncomfortable. Other embodiments utilize non-continuous lighting.

Operation 406 is then performed to position the subject S at an appropriate location, such as between the video camera system 102 and the background 112 (FIG. 1). The subject S can be seated, standing, or arranged within a group of subjects, for example. In some embodiments subject data and possibly other data is also obtained from the subject S at this time.

Operations 408 and 424 are performed to begin the photography session. For example, in some embodiments the photographer P provides inputs into the video camera 120 or video camera system 102 to select the pre-record mode.

Following operation 424, the video photography system 100 starts video recording in operation 426, while also initiating a background illumination sequence with the background lighting system 104 (FIG. 1). An example of a background illumination sequence is illustrated and described in more detail with reference to FIG. 16.

In some embodiments, operation 426 involves operating the video camera in a pre-record mode. When operating in the pre-record mode, the video camera begins video recording immediately, but only stores a buffer of a predetermined period of time, such as three or five seconds. After recording has occurred for the predetermined period of time, portions of the video are deleted such that only the most recent video remains stored in the buffer. Operation 426 continues the recording and discarding until the capture button is selected in operation 430.

While operations 426 and 428 are occurring, the photographer P performs operation 410 to engage the subject S. During this time, the photographer P interacts with the subject S to put the subject S into a desired pose and to attempt to elicit a pleasant and natural expression from the subject S. The photographer P observes the subject S and watches for a good expression.

After a good expression has been seen by the photographer P, the photographer P provides an input in operation 412, such as to select the capture button 184 of the handheld control 128 (FIG. 6). Because of the prerecord buffer, the photographer P can interact with the subject S more naturally and casually. The photographer P can wait until the expression has been recorded before selecting the capture button, and can even wait as long as the predetermined period of time after the expression without losing the opportunity to capture the photograph including the good expression.

The selection of the capture button is detected in operation 430 by the video photography system 100. At this time, the photographs stored in the buffer are saved in a new video file and the recording continues to capture additional photographs (operation 432) that are also stored in the same video file. The pre-record mode is then terminated.

In another possible embodiment, operations 412 and 430 monitor for a different input, such as the selection of the record button 182 of the handheld control 128 (FIG. 6), or another input that can be communicated to the video camera 120 through the LANC port, for example, rather than the capture button 184.

At operation 432 the video photography system 100 continues recording for a second predetermined period of time after the capture button has been selected. This second recording period continues to capture photographs of the subject S for a period of time in case the best expression follows the selection of the capture button.

In some embodiments, data is encoded into the video recording during operation 432. The data can include, for example, subject data or job data. Encoding of the data into the video recording can occur by generating lighting conditions that are recorded within the background portion of the photographs. The lighting conditions can be subsequently processed by a computing device to decode the data from the lighting conditions. Encoding of the data can also be performed by generating audio tones that are recorded in one or more of the audio tracks of the video recording. The audio tones can be subsequently processed by a computing device to decode the data from the audio tones. In either case, the data is stored in the video file, and associated with the photographs in the video file. The data can alternatively be stored at other portions of the video file, such as at the beginning of the video recording, or during the video recording.

In another possible embodiment, operation 432 is not performed, and the video recording is terminated at operation 434 after detection that the capture button has been selected 430.

Operation 434 is then performed to stop the video recording following the second predetermined period of time.

Operation 436 operates to save the video file including the photographs and audio into a computer readable storage device. In some embodiments the photographs and audio are transferred to another computing device using a data transfer technology, such as those described herein.

FIG. 15 is a timing diagram illustrating further exemplary details of the operation of the video photography system 100 when operating in the Got it photography mode. FIG. 15 also illustrates an example of the operation 384 (FIG. 13) during which photographs are captured with the photography system 100, and an example of operation 402 in which the photography system 100 operates in the Got it photography mode.

The timing diagram illustrates operations performed by the photographer P, the subject S, and the video photography system 100. Some of the operations may alternatively be performed by one or more separate computing devices.

The timing diagram begins with the initiation of the video recording 426 with the video photography system 100. Once the video recording 426 has begun, the photographer P engages with the subject S (operation 410). The subject S is recorded during this time, such as using a pre-recording mode, which stores the photographs in a buffer for a predetermined period of time, such as X seconds. After the predetermined period of time has elapsed, the video photography system 100 begins discarding the oldest photographs 454. The photographer P works with the subject S during operation 410 to make the subject S feel comfortable, position the subject S into a desired pose, and to attempt to elicit a good expression 452 from the subject S.

When the photographer P sees a good expression 452, or shortly thereafter, the photographer P presses a capture button (operation 412) to indicate that the good expression has occurred.

In some embodiments, the pre-recording operation 426 is then terminated and the buffer 456 containing photographs and audio from the preceding period of time (e.g., X seconds) is saved. Recording continues in operation 432 for a second predetermined period of time (e.g., Y seconds) following the pressing of the capture button (operation 412).

The video file 458 is saved in a computer readable storage device in operation 436. The video file 458 includes a first portion 460, a second portion 462, and a third portion 464, which each include a plurality of frames 466. The first portion 460 contains a portion of the video that was stored in the buffer 456 prior to the selection of the capture button 412. The second portion 462 contains the portion of the video 458 that was during the period of time of the good expression 452. The third portion 464 contains a portion of the video that was captured after the selection of the capture button 412.

When operating in the Got it photography mode, the photographer P presses the capture button after viewing the good expression 452. As a result, knowing the time at which the capture button is selected (412) allows the video photography system to determine that the good expression 452 was captured during the second portion 462 of the video 458 that ends at the time that the capture button was selected 412. A third predetermined period of time (e.g., Z) is used to identify the start of the second period 462. In some embodiments, the third predetermined period of time is adjustable. In some embodiments, the third predetermined period of time is photographer specific. For example, the third predetermined period of time can be measured by the photography system in a simulation or educational training session prior to the photography session. In some embodiments, the ending point of the second period is also adjustable to be prior to or after the selection of the capture button 412 based on a fourth predetermined period of time (not shown in FIG. 15), that can be measured or computed for the photographer P. In yet another embodiment, testing of a population of photographers may provide statistics that can be used to set the starting and ending times of the second portion 462 relative to the time of the capture button selection 412. In some embodiments photographers are assigned a score during a training/testing session. The score is input into the photography system to adjust photography system configuration settings. The score can also be used as a tool for comparing the skill, competence, or proficiency of a photographer with another photographer.

In some embodiments, data identifying the frames 466 that are part of the second portion 462 is stored to permit these frames to be subsequently identified. In some embodiments, each individual frame 466 of the second portion 462 is identified as potentially containing a capture of the good expression 452. The data can be stored in metadata, or in a separate image file, for example. In another embodiment, the data is stored in an audio track of the video file 458.

In some embodiments, operation 386 is subsequently performed to reduce the quantity of frames that are stored. Due to the large number of photographs that can be captured with a high frame rate video camera, and the potentially large size of each frame when a high resolution video camera is used, a lot of storage space can be saved by reducing the quantity of frames that are stored. In some embodiments, operation 386 extracts and saves only a fraction of the frames from the video file 458, such as frames 468. In some embodiments, a larger fraction of the frames in the second portion 462 are saved than in the first and third portions 460 and 464 due to the increased likelihood that the frames in the second portion 462 contain the best expression. In another possible embodiment, only frames 468 that are in the second portion 462 are saved.

Following the frame reduction operation 386, the remaining photographs in frames 468 are stored in a computer readable storage device, and can be subsequently transferred to another computing device, if desired.

Figure 24:
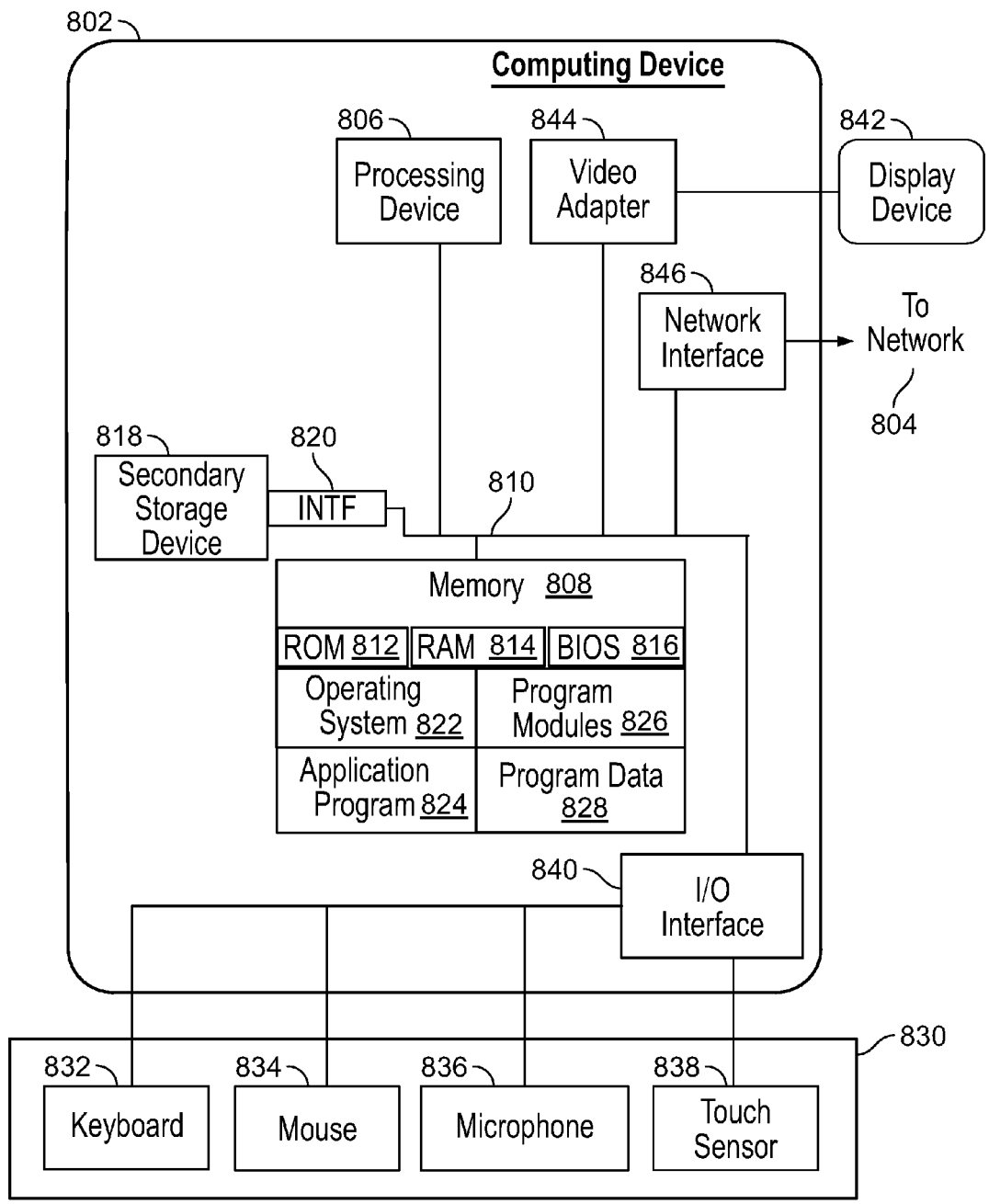
FIG. 24 illustrates an exemplary architecture of a computing device that can be used to implement aspects of the present disclosure.

Operations 436 and/or 386 can be performed by the video photography system 100 (FIG. 1), a portion of the video photography system (e.g., video camera system 102, video camera 120 (FIG. 2), or system controller 124), or by a separate computing device, such as illustrated in FIG. 24.

FIG. 16 is a timing diagram illustrating further exemplary details of the operation of the video photography system 100 when operating in the Got it photography mode.

The timing diagram illustrates examples of the operation 384 for capturing photographs (including a background illumination sequence operation 428), the operation 386 for processing the photographs, and operation 388 for generating a final product. The operation 384 is typically performed by a video photography system 100. The operations 386 and 388 can be performed by the video photography system, or one or more separate computing devices.

The timing diagram illustrates only a portion of the photography session illustrated in FIG. 15, and more specifically a period of time during which the good expression 452 (FIG. 15) is captured.

During this period of time, the video camera 120 operates to record the subject S with the operation 426, while illuminating the subject S with continuous subject lighting 106. The background lighting system 104 generates a background lighting sequence 428, an example of which is illustrated in FIG. 16.

In this example, the background lighting sequence includes generating light in a sequence using several different lighting conditions. In this example, the lighting conditions generate light for segments of time using two different colors, and each segment being separated from adjacent segments by dark segments in which there is little or no background illumination from the background lighting system 104. The colors include a first color 482 (e.g., green) and a second color 484 (e.g., blue). The background lighting system 104 generates a repeating and alternating sequence of light including the first color 482 and then the second color 484. The dark segments are periods in which the background lighting system 104 is not generating light (or is at least generating significantly less light).

The background lighting system 104 can operate in either an asynchronous mode (illustrated in FIG. 16), or a synchronous mode. When operating in the asynchronous mode, the timing of the light sequence is not synchronized with the timing of the video camera system 102. It is desirable that at least one frame is captured by the video camera system 102 is captured while the background lighting system 104 is generating light having the first color 482, and at least another frame is captured while the background lighting system 104 is generating light having the second color 484.

One way to ensure that each color is generated by the background lighting system 104 for a sufficient length of time is to generate the first color 482 and the second color 484 for a period of time that is at least equal to twice the frame duration (or twice the inverse of the frame rate) of the video camera system 102. For example, in some embodiments the background lighting system 104 generates each color for a period of time equal to about 2.5 times the frame duration (or 2.5 times the inverse of the frame rate).

In contrast, when operating in the synchronous mode, a timing signal is communicated to or between the video camera system 102 and the background lighting system 104 so that the video frames 466 are synchronized with the background lighting sequence. In this example, the period of time that the background lighting system 104 operates to generate the first and second colors can be reduced to equal to or slightly more than the frame duration.

The lighting sequence generated by the background lighting system 104 is detectable by the video camera system 102 and changes the appearance of the background in the frames 466. For example, the frame 466 that is captured while the background lighting system generates the first color 482 (e.g., green) has a correspondingly colored background, such that the frame can be referred to as a green video frame (VF-G) 502, for example. The frame 466 captured while the background lighting system 104 is dark has a dark background, such that the frame can be referred to as a dark video frame (VF-D) 504. The frame 466 captured while the background lighting system 104 generates the second color 484 (e.g., blue) has a correspondingly colored background, such that the frame can be referred to as a blue video frame (VF-B) 506, for example.

The operation 386 involves the identification and selection of the green, dark, and blue video frames 502, 504, and 506 from the video recording 458. For example, the frames can be selected by identifying frames that were captured within the second period 462 (FIG. 15), and then analyzing the frames 466 to classify frames as green, dark, blue, or other. In some embodiments the dark video frame 504 is first selected, and then the nearest green video frame 502 and the nearest blue video frame 506 are selected. It is desirable to use the nearest colored video frames to reduce variation between the frames, such as caused by movement of the subject S or video camera 120.

The operation 388 then performs additional processing on the frames, such as to generate the final product, or an intermediate image that can be used to generate the final product. In this example, background replacement is performed, involving the discriminator operation 512 to generate a mask 514 and subject image 516.

The operation 512 is a discriminator operation that evaluates the colored video frames 502 and 506 to identify portions of the video frames that contain the subject S and portions of the video frames that contain the background. In some embodiments, Chroma key processing is used to discriminate between the background and the foreground. In some embodiments only one of the colored video frames is used for this processing. However, in other embodiments both of two (or more) differently colored video frames are evaluated to allow the processing device to select the colored video frame that most accurately distinguishes the background from the subject S. For example, the colored video frame that identifies the least area of the photograph as background can be determined to be the most accurate. In yet another embodiment, both frames are evaluated together and compared to identify the subject S and the background. Exemplary algorithms for identifying the subject portion and the background portion in an image are described in more detail herein.

A mask 514 and subject image 516 are created as a result of the discriminator operation 512. The mask identifies portions of the photograph that represent the subject S, portions of the photograph that are background, and portions of the photograph that have contributions from both the foreground and the background. The subject image 516 is generated from the dark video frame 504 by removing those portions of the frame 504 that contain the background.

Background replacement is then performed using the mask 514, subject image 516, and a desired background art image 518, to generate the final photograph 520. Exemplary background replacement techniques are described herein.

In some embodiments, the process described above is repeated for additional video frames, such as to retrieve video frames 502', 504', and 506', if additional photographs are desired. Further, in some embodiments multiple photographs are combined to generate a final video product.

Figure 17:
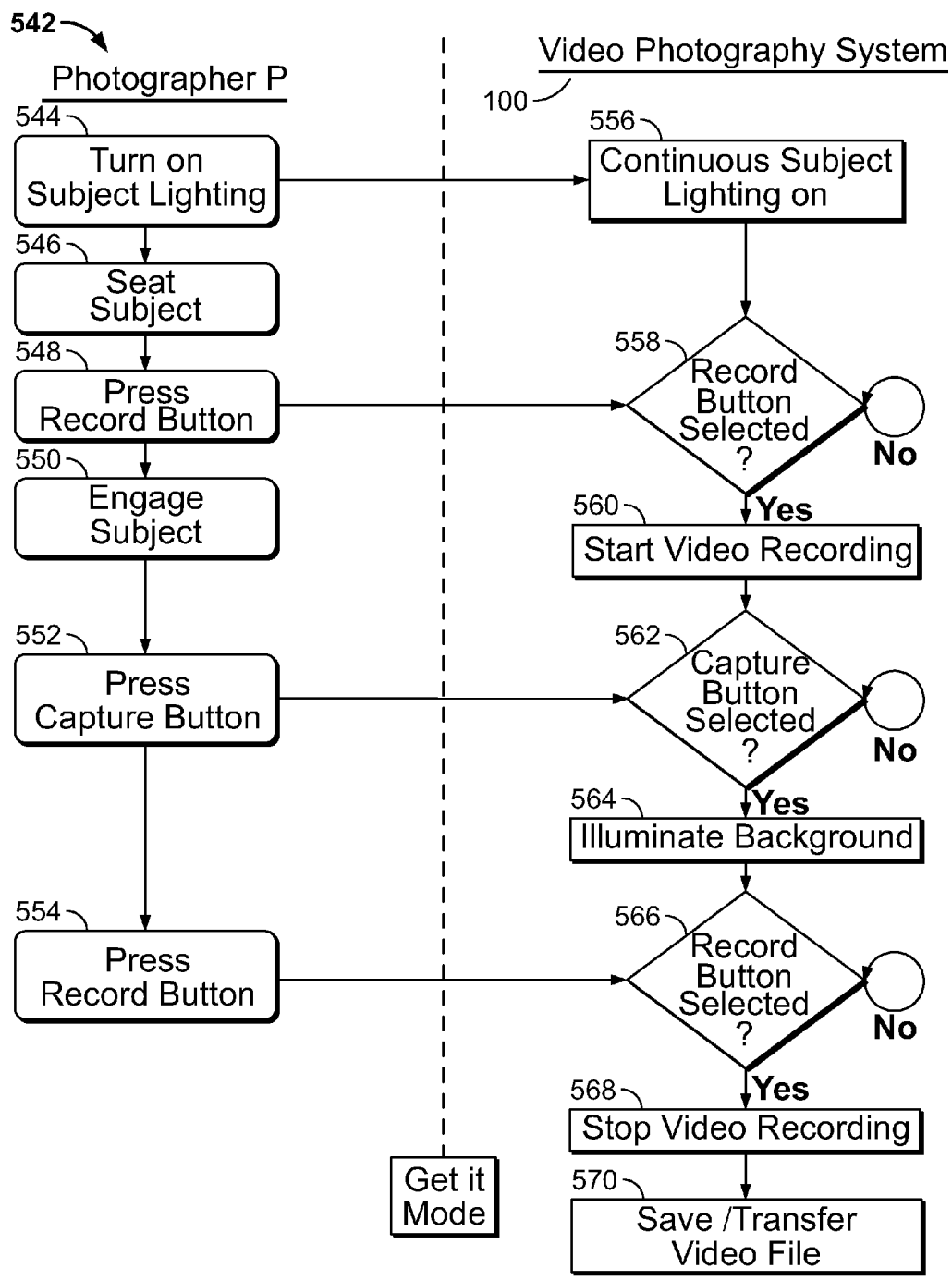
FIG. 17 is a flow chart illustrating a method of operating the video photography system in the "Get it" photography mode.
Figure 18:
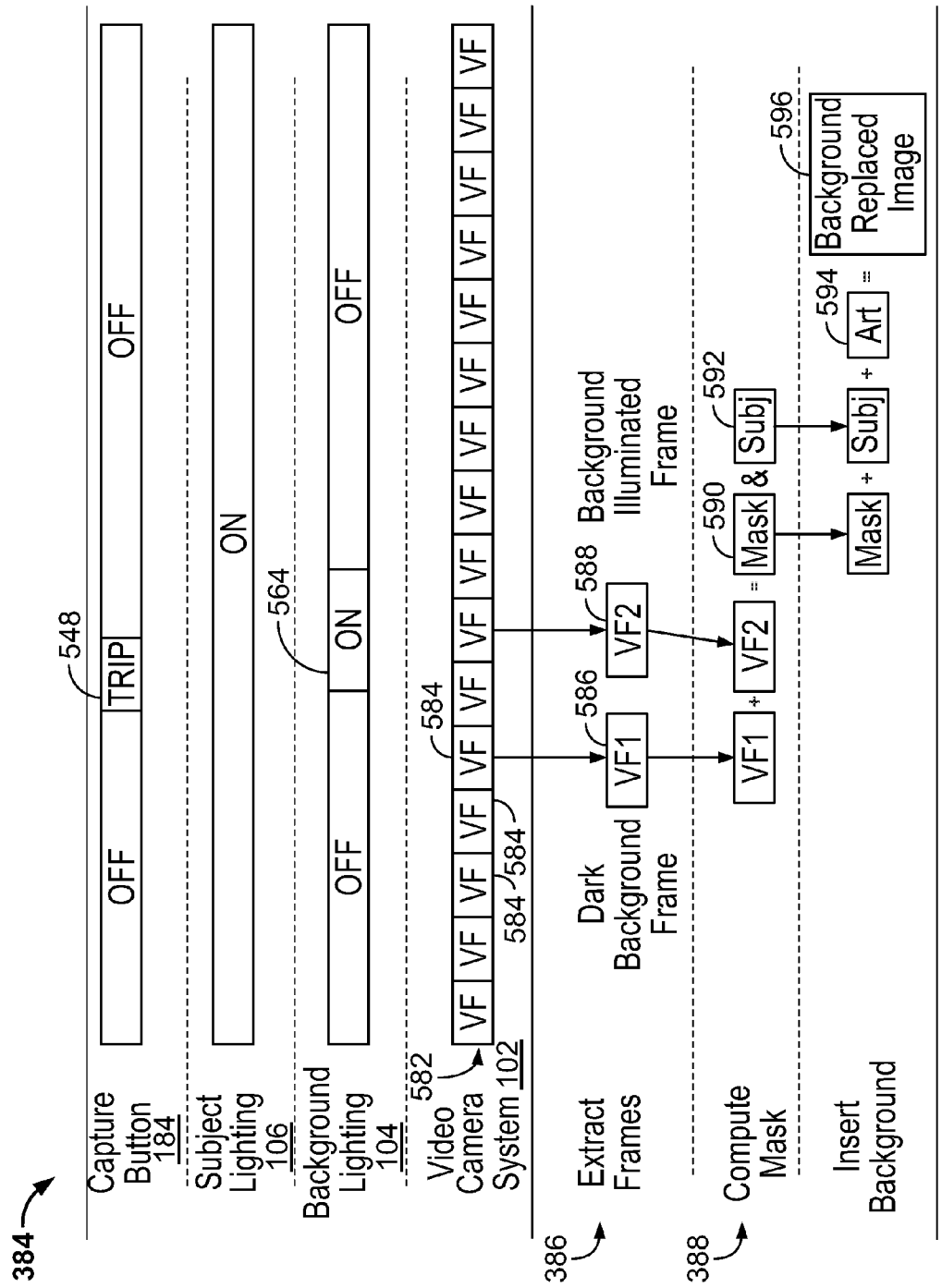
FIG. 18 is a timing diagram illustrating further exemplary details of the operation of the video photography system when operating in the "Get it" photography mode.

FIGS. 17-18 illustrate an exemplary method of operating the video photography system 100 (FIG. 1). In this example, the video photography system 100 is referred to as operating in the "Get it" photography mode. FIGS. 17-18 also illustrate another example of the operation 384, shown in FIG. 13, for capturing photographs with the photography system 100.

FIG. 17 is a flow chart illustrating a method 542 of operating the video photography system 100 in the Get it photography mode. In this example, the method 542 includes operations performed by the photographer P (or other person) and operations performed by the video photography system 100. More specifically, in this example the photographer P performs the operations 544, 546, 548, 550, 552, and 554; and the video photography system 100 performs the operations 556, 558, 560, 562, 564, 566, 568, and 570.

The operations 544 and 556 are performed to turn on the subject (foreground) lighting. Turning on the subject lighting can involve, for example, selecting a button in a user interface, flipping a switch, and/or plugging in the subject lighting system 106 (FIG. 1). In some embodiments, the operation is performed automatically by the video photography system 100 without the operation 544. The subject lighting can be continuous or non-continuous. Alternatively, lighting can be provided by a separate lighting system or by natural sunlight.

The operation 546 is then performed to seat or position the subject S at an appropriate location, such as between the video camera system 102 and the background 112 (FIG. 1).

The operations 548, 558, and 560 initiate the recording upon receipt of an input from the photographer P, such as upon selection of the record button 182 on the handheld control 128 (FIG. 6). The photographer P then engages with the subject S in operation 550 to attempt to elicit a good expression or otherwise guide the subject S through the photography session.

When the photographer P sees or anticipates a good expression, the photographer P provides an input at the operation 552, such as by selecting the capture button 184 of the handheld control 128. The input is detected in operation 562, which initiates a background illumination sequence 564, such as described in more detail with reference to FIG. 18.

The photography session comes to an end with the operations 554, 566, and 568 when the photographer P provides an input, such as by again selecting the record button 182 on the handheld control (FIG. 6). Alternatively, video recording can automatically stop after a predetermined period of time following the selection of the capture button 552 (see, for example, operations 430, 432, and 434 shown in FIG. 14).

In some embodiments, data is encoded into the video file after or during the background illumination sequence 564, or after the selection of the record button (or other input) in operation 554. Data can be encoded using background lighting conditions, audio tones, or by directly storing data within the video file, such as within a metadata field, for example.

In the operation 570 the photographs and audio (if applicable) are stored, such as in a video file, in a computer readable storage device. If desired the data can then be transferred to another computing device.

FIG. 18 is a timing diagram illustrating further exemplary details of the operation of the video photography system 100 when operating in the Get it photography mode.

The timing diagram illustrates examples of the operation 384 for capturing photographs (including a background illumination sequence operation 564), the operation 386 for processing the photographs, and the operation 388 for generating a final product. The operation 384 is typically performed by a video photography system 100. The operations 386 and 388 can be performed by the video photography system, or one or more separate computing devices.

In this example, the video photography system operates to capture photographs in the operation 384. During the operation, the subject lighting 106 is continuously on and the video camera system 102 is recording.

When the photographer P views a good expression, or anticipates that the good expression is about to occur, the photographer P provides an input, such as through the capture button 184 (operation 548).

At this time, the background lighting system 104 generates a background illumination sequence 564 using different lighting conditions. In this example, the background lighting sequence includes periods with little or no background illumination by the background lighting system, and another period in which the background is illuminated by the background lighting system 104. The background illumination involves a single pulse of light having a desired color for a predetermined period of time. An example of the desired color is blue. Other colors are used in other embodiments, such as green, red, white, etc. The predetermined period of time is calculated to last for at least the duration of two consecutive frames of the video camera system 102 in an asynchronous mode (as shown in FIG. 18), or at least one frame in a synchronous mode.

The photographs are stored in the video file 582, which includes a plurality of frames 584.

After the photographs have been captured, the operation 386 is performed to extract the desired frames from the video recording 582. In this example, a dark frame 586 and a background illuminated frame 588 are selected. The dark frame 586 is identified as the last full frame that was captured prior to the background illumination sequence operation 564. The background illuminated frame 588 is the closest frame to the dark frame 586 that had background illumination during the duration of the frame capture.

The operation 388 is then performed to perform the background replacement in a similar manner as described with reference to FIG. 16, except that in this example only a single background illuminated frame 588 is used to generate the mask 590 and subject image 592. The mask 590, subject image 592, and desired background artwork 594 are then combined to generate the final photograph 596.

FIGS. 19-23 illustrate an exemplary method of operating the video photography system 100 (FIG. 1). In this example, the video photography system 100 is referred to as operating in the "Video Replacement" photography mode. FIGS. 19-23 also illustrate another example of the operation 384, shown in FIG. 13, for capturing photographs with the photography system 100.

Figure 19:
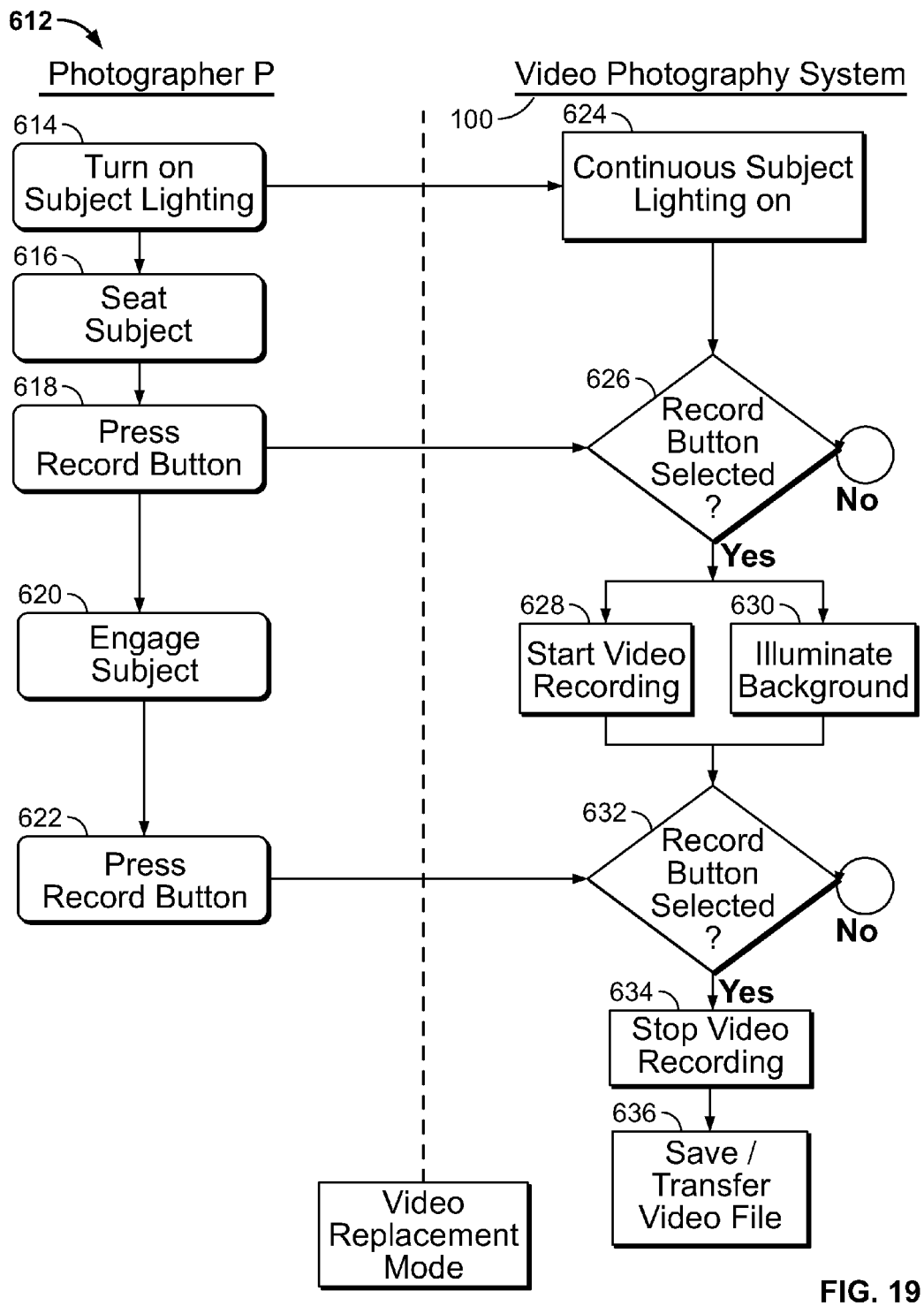
FIG. 19 is a flow chart illustrating a method of operating the video photography system in the "Video Replacement" photography mode.

FIG. 19 is a flow chart illustrating a method 612 of operating the video photography system 100 in the Video Replacement photography mode. In this example, the method 612 includes operations performed by the photographer P (or other person) and operations performed by the video photography system 100. More specifically, in this example the photographer P performs the operation 614, 616, 618, 620, and 622; and the video photography system 100 performs the operations 624, 626, 628, 630, 632, 634, and 636.

The operations 614 and 624 are performed to turn on the subject lighting system 106 (FIG. 1) to provide continuous subject lighting. Other embodiments utilize non-continuous lighting. In another embodiment, lighting can be provided by a separate lighting system or by natural sunlight.

In the operation 616 the subject S is seated or positioned between the video camera system 102 and the background 112 (FIG. 1).

The operations 618 and 626 initiate video recording when an input is received by the photographer P, such as by the selection of the record button 182 of the handheld control 128 (FIG. 6). Upon receipt of the input, the video photography system 100 begins video recording at the operation 628, and also begins a background illumination sequence 630. An example of the background illumination sequence is illustrated and described in more detail with reference to FIG. 20.

Once recording has begun, the photographer P then engages with the subject S in the operation 620 to elicit a good expression or otherwise guide the subject S through the photography session. In some embodiments, the photographer guides the subject S in an attempt to capture the subject's personality through conversation and actions.

At the conclusion of the session, the photographer P provides another input, such as by again selecting the record button 182 on the handheld control 128. Video recording is then stopped at the operation 634.

In the operation 636 the photographs and audio (if applicable) are stored, such as in a video file, in a computer readable storage device. If desired, the data can then be transferred to another computing device.

Figure 20:
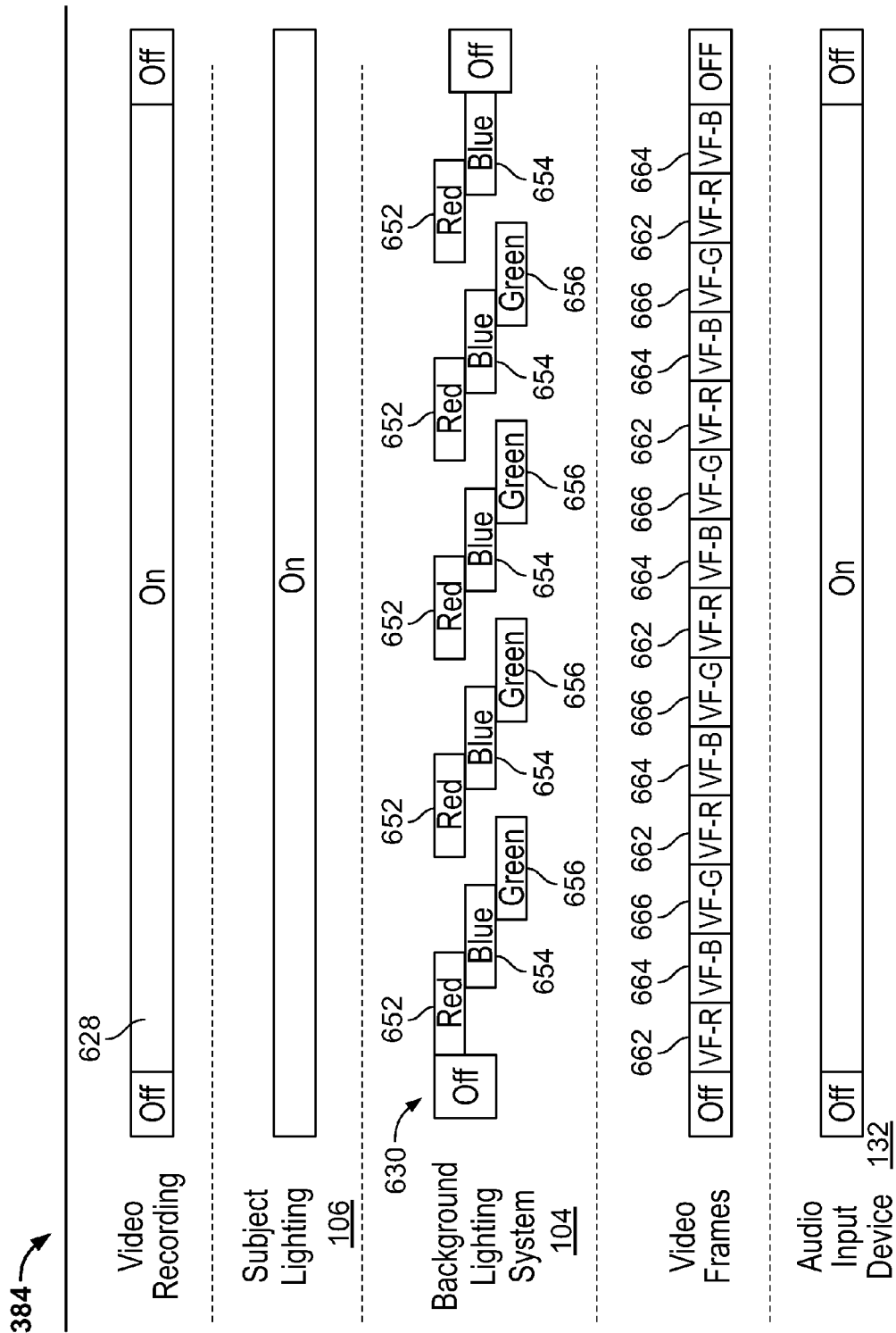
FIG. 20 is a timing diagram illustrating further exemplary details of the operation of the video photography system when operating in the Video Replacement photography mode.

FIG. 20 is a timing diagram illustrating further exemplary details of the operation of the video photography system 100 when operating in the Video Replacement photography mode.

The timing diagram illustrates examples of the operation 384 for capturing photographs, (including a background illumination sequence 630 shown in FIG. 19).

In this example, the subject lighting 106 is on continuously during the video recording.

The background lighting system 104 is controlled to generate a background lighting sequence using several different lighting conditions. The background lighting sequence involves the use of multiple different colors of lights, such as having a first color 652 (e.g., red), a second color 654 (e.g., blue), and a third color 656 (e.g., green).

In one example embodiment, the red light 652 is turned on for a period greater than the duration of a single frame of the video camera system 102. The frame captured during the red illumination is referred to as a red video frame 662 (VF-R).

Before the red light 654 are turned off, the blue light 654 is turned on, such that the red and blue lights 652 and 654 are both on for a period, until the red light 652 is turned off. The blue light 654 remains on for a period greater than the duration of a single frame of the video camera system 102. The frame captured during the blue illumination is referred to as a blue video frame 664 (VF-B).

Before the blue light 654 is turned off, the green light 656 is turned on, such that the blue light 654 and the green light 656 are both on for a period, until the blue light 654 is turned off. The green light 656 remains on for a period greater than the duration of a single frame of the video camera system 102. The frame captured during the green illumination is referred to as a green video frame 666 (VF-G).

Figure 21:
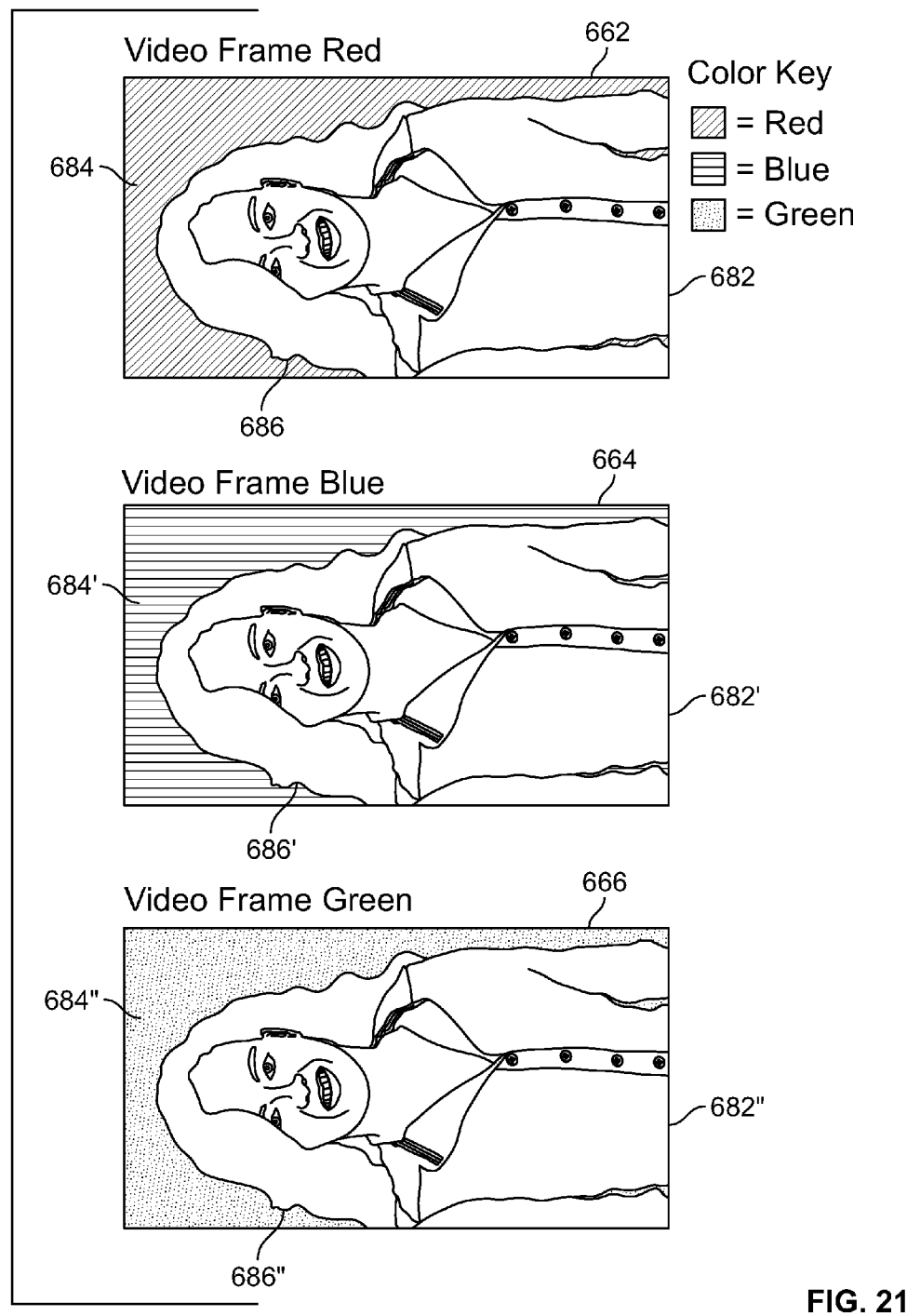
FIG. 21 illustrates examples of several frames captured by the video photography system while operating in the Video Replacement photography mode.

Examples of the red, blue, and green video frames 662, 664, and 666 are illustrated in FIG. 21.

In some embodiments, the intensity of the different colored lights is controlled to fade in and out gradually, generating light gradients that vary from a single color to varying combinations of two colors. For example, the background illumination sequence illustrated in FIG. 20 begins with red 652, followed by a gradual introduction of blue 654. When both are at equal intensities, the combination of red 652 and blue 654 creates magenta. The red then fades out leaving the blue 654. The green 656 then fades in, and when the two are at equal intensities creates cyan. The blue 654 then fades out leaving green 656. The red 652 then fades in, and the combination at equal intensities creates yellow. The green 656 then fades out and the cycle is repeated.

The background illumination sequence can operate asynchronously with the video camera system 102, or synchronously. The example shown in FIG. 20 illustrates a background lighting sequence that can be used for asynchronous operation. In this example, each light 652, 654, and 656 is controlled to remain on for a duration of greater than one frame of the video camera. For example, in some embodiments the lights are controlled to remain on for one and one half frames and then turn off for one and one half frames. The frequency of each light 652, 654, and 656 is about equal to one third of the frame rate.

In another example, some embodiments utilize a background lighting sequence that can be used for synchronous operation. In this example, the illumination of the lights 652, 654, and 656 is synchronized with the video camera, so that each light 652, 654, and 656 is turned on in consecutive frames, and then off for the following two frames. For example, light 652 is turned on for one frame, then light 654 is turned on for the next frame, and light 656 is turned on for the third frame. The cycle then repeats While the video recording 628 is underway, the video camera system 102 also records audible sounds, in some embodiments, such as using the audio input device 132. The audio can be stored in the video file, or as a separate file, in a computer readable storage device.

FIG. 21 illustrates examples of several frames captured by the video photography system 100 while operating in the Video Replacement photography mode. Specifically, FIG. 21 illustrates an example red video frame 662, blue video frame 664, and green video frame 666.

Each of the video frames includes a subject portion 682, a background portion 684, and a transition portion 686. The subject portion 682 is the portion of the photograph that includes an image of the subject S, and the background portion 684 is the portion that contains an image of the background 112 (FIG. 1). The transition portion 686 is the portion of the image between the subject portion 682 and the background portion 684, that includes contributions from both the background 112 and the subject S.

The subject portions 682 (including 682, 682', and 682") of the video frames 662, 664, and 666 are very similar to each other because each video frame was taken consecutively and in rapid succession by the video camera system 102. Due to the small amount of time between each frame capture, movement of the subject S results in very little variation in the subject portions 682 of the frames 662, 664, and 666.

The background portions 684 (including 684, 684', and 684") of the video frames 662, 664, and 666 all contain an image of the background 112, but have different colors due to the background illumination sequence. For example, background portion 684 has a red color, background portion 684' has a blue color, and background portion 684" has a green color.

When operating in an asynchronous mode, the photographs may be taken during a color transition. If so, a vertical color gradient may be visible or measurable in the background portion 684. For example, in the red video frame 662, the color of the background portion may be red toward the bottom of the image (to the subject's right) and more of a magenta color toward the top of the image (to the subject's left). This color gradient is the result of the fact that many video cameras do not capture an entire image at once, and instead integrate light one row of pixels at a time. As a result, those rows of pixels that are integrated first may detect a different background color than those rows of pixels that are integrated last.

This color gradient can be eliminated by synchronizing the video camera system 102 with the background lighting system 104 so that the frames are captured when the background 112 is illuminated with only one of the multiple colors, or by adjusting the background illumination sequence to reduce or eliminate the color transitions.

Even though the asynchronous mode may have the visible background color gradient, the asynchronous mode may have advantages over the synchronous mode, such as by enabling the use of a less complex or less expensive video camera 120 (FIG. 2). The frames captured in either mode can be processed using the techniques described below to generate high quality background replaced products.

Figure 22:
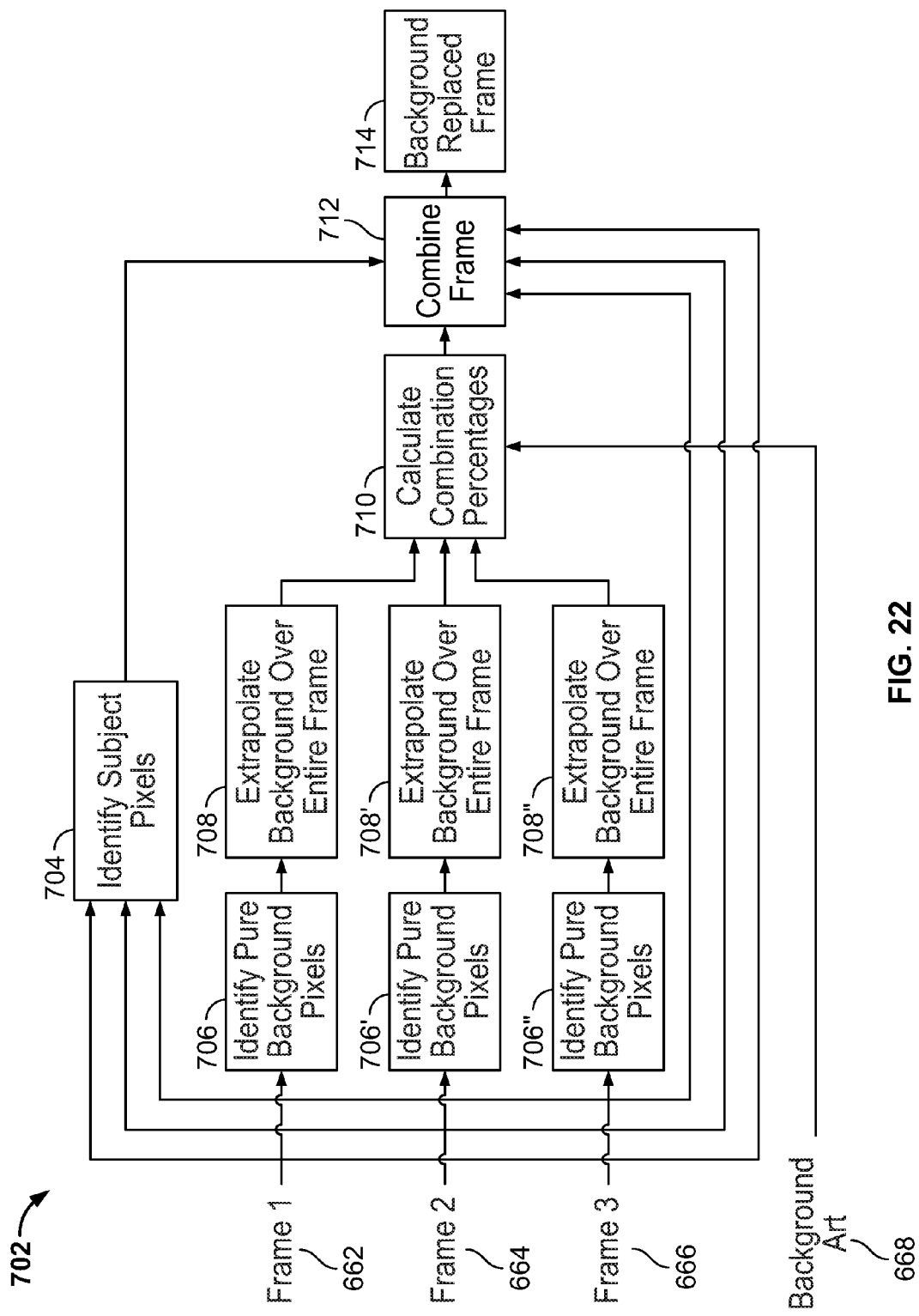
FIG. 22 is a flow chart illustrating a method of processing the frames shown in FIG. 21 to perform background replacement.

FIG. 22 is a flow chart illustrating a method 702 of processing the frames shown in FIG. 21 to perform background replacement. In this example, the method 702 receives inputs of video frames having different background lighting conditions (for example, a red video frame 662, a blue video frame 664, and a green video frame 666), and a desired background art image 668. The method 702 includes operations 704, 706, 708, 710, and 712, to generate a background replaced frame 714, which is a background replaced equivalent of frame 664.

The operation 704 involves the identification of subject pixels, based on the video frames 662, 664, and 666. The subject pixels are the pixels that the three frames 662, 664, and 666 share within a range of motion. For instance, even if a portion of the subject (such as a button of a shirt) moves slightly between the video frames, the corresponding pixels will be considered part of the subject if the corresponding pixels are detected and visible in all three frames.

In an example embodiment, the operation 704 first evaluates frame 664, pixel by pixel, and determines if a pixel of a given color in frame 664 is in close proximity to a pixel of the same or nearly the same color in frames 662 and 666. If a pixel is greater than a certain number pixels away or is a sufficiently different color than another pixel, the operation determines that the pixels do not correspond to each other. Because of the different background lighting conditions between the frames, the background pixels will always have a sufficiently different color so that they are not identified as subject pixels. In addition, border or transition pixels (pixels at the intersection between the subject and the background) will also not be considered subject pixels due to the variations in background color detectable in these pixels.

The operation 706 is next performed to identify pure background pixels in video frames 662, 664, and 666. Operation 706 analyzes each frame 662, 664, and 666 separately in operations 706, 706', and 706".

The operation 706 first generates a chroma reference. The chroma reference is made up of two channels, which are conversions from the images original red, green, and blue (RGB) color space. There is a red chroma channel (r) and a green chroma channel (g), where r and g can be computed by the following formulas:

$$r=R/(R+G+B)$$

$$g=G/(R+G+B)$$

If the frames 662, 664, and 666 were captured in the asynchronous mode (such that a vertical background color gradient may be present in the frames), a separate chroma reference is computed for each row of pixels. Then, the chroma for each pixel is compared to the corresponding chroma reference. If the chroma of a pixel is within a predetermined range from the chroma reference, the pixel is considered a pure background pixel.

The operation 708 is next performed to extrapolate the background over the transition portion 686 of the frame. After the operation 706 has been completed to identify the pure background pixels, the operation 708 uses the background pixels to extrapolate, interpolate, or otherwise generate an estimate of, the colors of the background 112 adjacent to and behind the transition portion 686. In some embodiments, the operation 708 first attempts to estimate background pixel values based on the color of pure background pixels in the same row. So, for example, if the subject is centered in the image, pure background pixels may be located on either side of the subject within the same row of pixels. The pixels immediately adjacent to the pure background pixels can be assigned colors that are the same as adjacent pixels, and subsequent pixels can be extrapolated based on the colors of the pixels on either side of the subject.

The operation 708 can also consider the colors of the pure background pixels in other rows, or the rate of change of the colors of the pure background pixels in the same or other rows, in order to generate estimates of background pixels. For example, two dimensional interpolation techniques such as nearest-neighbor interpolation, bilinear interpolation and bicubic interpolation, or others, can be used to generate the estimate of background pixel colors.

The operation 708 (708, 708', and 708") can be repeated for each of the video frames 662, 664, and 666 based on the different colored background lighting conditions to generate a new set of images including background frame 709, 709', and 709", respectively.

Figure 23:
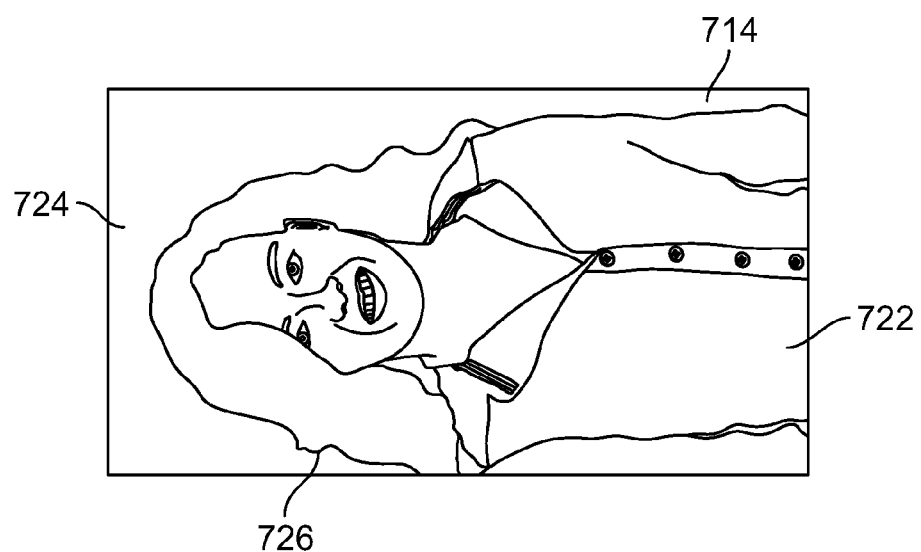
FIG. 23 illustrates an example of a background replaced photograph.

The operation 710 is then performed to calculate the combination percentages for the background portion 724 and the transition portion 726 between the background portions 724 and the subject portion 722 of the background replaced frame 714, as shown in FIG. 23. The combination percentages identify the percent of contribution to the background replaced frame 714 from frames 662, 664, and 666. New weighting values W1, W2, W3 are calculated for each color channel of each pixel for the background portion 724 and the transition portion 726 of the background replaced frame 714.

In some embodiments, the following constraints can be used to solve for W1, W2, and W3 for every pixel in the transition portion 726, starting with the red channel:

Constraint 1:

Frame 714 red channel=$W1$*(Frame 662 red channel)+$W2$*(Frame 664 red channel)+$W3$*(Frame 666 red channel)

where W1+W2+W3=1.0

Constraint 2:

The frame (662, 664, or 666) that has a red value between the other two frames can be assigned a weighting value of 0.3333.

Constraint 3:

When the red channel values of Background Frames 709, 709', and 709" are added together, they will arrive at the red channel value of the background art 668 to be replaced. For example:

(Background art 668 red channel)=$W1$*(background frame 709 red channel)+$W2$*(background frame 709' red channel)+$W3$*(background frame 709" red channel)

The operation 712 is then performed to combine the red channel from frames 662, 664, and 666 to generate the red channel for generate the background replaced frame 714.

In some embodiments, the red channel of the subject portion 722 of the background replaced frame 714 is formed of the red channel pixels of the subject portion 682' of frame 664, while the red channel pixels of the background and transition portions 724 and 726 are computed using the following formula:

Frame 714 red channel=$W1$*(Frame 662 red channel)+$W2$*(Frame 664 red channel)+$W3$*(Frame 666 red channel)

where W1, W2, and W3 are the contribution percentage values computed in the operation 710.

This process is then repeated for the green channel and the blue channel of frame 714, as part of operations 710 and 712.

The background replaced frame 714 can then be used as a final background replaced photograph product, or can be further processed to generate the final product. In addition, or alternatively, a video product can be generated by repeating the process illustrated in FIG. 22 for each frame, or for a selection of frames, captured during a video photography session, where the multiple background replaced frames 714 are combined together into a video file to generate a final video product.

The method 702, or any one or more of the associated operations can be performed by the video photography system 100, or by a separate computing device, such as the computing device 802, shown in FIG. 24.

The data generated in each operation of method 702 is stored at least temporarily in computer readable storage media. In some embodiments, the operations of method 702 are performed by two or more computing devices. One computing device can perform any portion of the method 702, while one or more other computing devices perform any other portions of method 702. In some embodiments, data is transferred between the two or more computing devices between two or more of the operations shown in FIG. 22. Accordingly, in some embodiments methods according to the present disclosure, performed by a particular computing device, include only a subset of the operations shown in FIG. 22 and described herein.

Further, in another possible embodiment, some of the operations shown in FIG. 22 can be performed for other purposes, other than for background replacement. For example, some embodiments perform a method of identifying pixels corresponding to the subject (a person, animal, or other foreground object). The pixels include operation 704 to identify pure subject pixels (from the subject portion of an image) and transition pixels (from the transition portion of the image). The transition pixels are those pixels that are not pure subject pixels (operation 704) and are not pure background pixels (operation 706). A method of applying an effect (e.g., a portrait effect) to a subject can also be performed by applying an effect to the subject and transitions pixels.

FIG. 23 illustrates an example of a background replaced photograph 714. The photograph includes the subject portion 722, background portion 724, and transition portion 726. As noted above, the subject portion 722 can be formed of the subject portion 682' (FIG. 21), while the background and transition portions can be computed based on the video frames 662, 664, and 666, and the background art image 668. The background art image 668 can be a single frame of a background art video, in some embodiments.

FIG. 24 illustrates an exemplary architecture of a computing device 802 that can be used to implement aspects of the present disclosure, including as a portion of the video photography system 100, video camera system 102, or as a separate computing device. The computing device illustrated in FIG. 24 can be used to execute an operating system, application programs, and software modules (or software engines) that can be operated to perform one or more of the functions, methods, operations, or other features illustrated and described herein. Similarly, a combination of computing devices 802 can be used to collectively perform any of these.

The computing device 802 includes, in some embodiments, at least one processing device 806, such as a central processing unit (CPU). A variety of processing devices are available from a variety of manufacturers, for example, Intel or Advanced Micro Devices. In this example, the computing device 802 also includes a system memory 808, and a system bus 810 that couples various system components including the system memory 808 to the processing device 806. The system bus 810 is one of any number of types of bus structures including a memory bus, or memory controller; a peripheral bus; and a local bus using any of a variety of bus architectures.

Examples of computing devices suitable for the computing device 802 include a desktop computer, a laptop computer, a tablet computer, a mobile computing device (such as a smart phone, an iPod® or iPad® mobile digital device, or other mobile devices), or other devices configured to process digital instructions.

The system memory 808 includes read only memory 812 and random access memory 814. A basic input/output system 816 containing the basic routines that act to transfer information within computing device 802, such as during start up, is typically stored in the read only memory 812.

The computing device 802 also includes a secondary storage device 818 in some embodiments, such as a hard disk drive, for storing digital data. The secondary storage device 818 is connected to the system bus 810 by a secondary storage interface 820. The secondary storage devices 818 and their associated computer readable media provide nonvolatile storage of computer readable instructions (including application programs and program modules), data structures, and other data for the computing device 802.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 818 or memory 808, including an operating system 822, one or more application programs 824, other program modules 826 (such as the software engines described herein), and program data 828. The computing device 802 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 802 through one or more input devices 830. Examples of input devices 830 include a keyboard 832, mouse 834, microphone 836, and touch sensor 838 (such as a touchpad or touch sensitive display). Other embodiments include other input devices 830. The input devices are often connected to the processing device 806 through an input/output interface 840 that is coupled to the system bus 810. These input devices 830 can be connected by any number of input/output interfaces, such as a parallel port, serial port, game port, or a universal serial bus. Wireless communication between input devices and the interface 840 is possible as well, and includes infrared, BLUETOOTH® wireless technology, 802.11a/b/g/n, cellular, or other radio frequency communication systems in some possible embodiments.

In this example embodiment, a display device 842, such as a monitor, liquid crystal display device, projector, or touch sensitive display device, is also connected to the system bus 810 via an interface, such as a video adapter 844. In addition to the display device 842, the computing device 802 can include various other peripheral devices (not shown), such as speakers or a printer.

When used in a local area networking environment or a wide area networking environment (such as the Internet), the computing device 802 is typically connected to the network 804 through a network interface, such as an Ethernet interface 846, or through a wireless communication device (such as a cellular communication device or a Wi-Fi communication device). Other possible embodiments use other communication devices. For example, some embodiments of the computing device 802 include a modem for communicating across the network.

The computing device 802 typically includes at least some form of computer-readable media. Computer readable media includes any available media that can be accessed by the computing device 802. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 802.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 24 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of capturing photographs, the method comprising:
receiving a first input from a photographer;
in response to receiving the first input:
generating a sequence of background lighting conditions on a background under a continuous foreground lighting condition, the background lighting conditions including at least a first lighting condition and a second lighting condition; and
capturing photographs of the subject with a video camera operating in a pre-recording mode while the sequence of background lighting conditions is being generated, the pre-recording mode having a buffer that stores a subset of the photographs captured over a first predetermined period of time, the subject being arranged between the video camera and the background, the first and second lighting conditions being distinguishable in the photographs;

receiving a second input from the photographer, the second input indicating that a good expression has occurred, wherein the second input is received while the video camera is operating in the pre-recording mode; and in response to receiving the second input, storing at least the subset of the photographs captured before receiving the second input in a computer readable storage device.

2. The method of claim 1, wherein the sequence of background lighting conditions encodes data in background portions of at least some of the photographs.

3. The method of claim 2, wherein the data includes subject data, job data, and photography data.

4. The method of claim 1, wherein the sequence of background lighting conditions identifies at least one of the photographs as a photograph that a photographer intended to capture.

5. The method of claim 1, wherein the background lighting conditions include the first lighting condition having a first color and dark lighting condition.

6. The method of claim 5, wherein the background lighting conditions further include a second lighting condition having a second color.

7. The method of claim 1, further comprising:
receiving data including at least subject data with a subject data input device;
generating a second sequence of background lighting conditions after receipt of the input to encode the subject data in background portions of a second subset of the photographs; and
storing the second subset of the photographs in the computer readable storage device.

8. The method of claim 1, further comprising:
receiving data including at least subject data with a subject data input device;
storing a sequence of audio tones encoding the subject data into the computer readable storage device to associate the subject data with the photographs.

9. The method of claim 8, wherein the data is encoded with dual tone multi-frequency encoding.

10. The method of claim 1, further comprising:
generating a still photograph using one of the photographs captured during the generation of the first lighting condition and another photograph captured prior to or after the generation of the first lighting condition.

11. The method of claim 10, further comprising:
identifying pixels corresponding to the subject, including pixels from a pure subject portion and pixels from a transition portion using the one of the photographs captured during the generation of the first lighting condition and another photograph captured prior to or after the generation of the first lighting condition.

12. The method of claim 11, further comprising applying an effect to at least some of the pixels corresponding to the subject.

13. The method of claim 11, wherein the subject is a foreground object.

14. The method of claim 1, wherein generating a sequence of background lighting conditions includes generating a repeating sequence of the first lighting condition having a first color, the second lighting condition having a second color, and a third lighting condition having a third color, wherein the first, second, and third colors are different colors; and wherein capturing photographs of the subject comprises capturing a first frame during the first lighting condition, a second frame during the second lighting condition, and a third frame during the third lighting condition.

15. The method of claim 14, further comprising: replacing a background portion of the second frame with a background art image using data from the first frame, the second frame, and the third frame by:
identifying subject pixels;
for each of the first, second, and third frames:
identifying pure background pixels;
generating an estimate of background pixels over a transition portion of the respective frame; and
generating a background frame including an estimate of background pixels over the transition portion of the respective frame;
calculating percentage contributions from the first, second, and third frames using the background frames; and
generating a background replaced frame with subject pixels from the second frame, background pixels from the background art image, and transition pixels from both of the second frame and the background art image according to the percentage contributions.

16. The method of claim 1, wherein the continuous foreground lighting condition is generated by an incandescent light source, a fluorescent light source, a high-intensity discharge light source, a light emitting diode light source, or natural sunlight.

17. A video photography system comprising:
a video camera system configured to:
receive a first input from a photographer;
in response to receiving the first input, capture photographs of a subject positioned between the video camera system and a background under a continuous foreground lighting condition, wherein at least a subset of the photographs captured over a first predetermined period of time are stored in a buffer;
receive a second input from the photographer, the second input indicating that a good expression has occurred; and
in response to receiving the second input, store at least the subset of the photographs captured before receiving the second input; and
a background lighting system configured to generate background lighting conditions on a background, the background lighting conditions being detectable in the photographs, wherein the background lighting conditions include at least a first lighting condition and a second lighting condition, the first lighting condition being distinguishable from the second lighting condition in the photographs.

18. The video photography system of claim 17, wherein the background lighting system is a display device and wherein the display device is the background.

19. The video photography system of claim 17, wherein the background lighting system further comprises:
a lighting module including a light source array, the light source array including a plurality of light emitting diode (LED) modules arranged in a repeating pattern, wherein each of the LED modules includes a printed circuit board and at least three LEDs, each LED configured to emit light having a substantially different wavelength than the other LEDs;
a light shield arranged adjacent the lighting module to block light from the lighting module from directly illuminating the subject; and a stand configured to support the lighting module in a spaced relationship to a floor.

20. The video photography system of claim 19, wherein the lighting module further comprises an LED drive including a power supply, and LED drive controller, and drive circuitry, wherein the LED drive is configured to receive a control signal and to operate the light source array to generate light according to the control signal.

21. The video photography system of claim 19, wherein the background lighting system further comprises a light modifier configured to distribute light from the lighting module onto the background.

22. The video photography system of claim 17, further comprising the background, wherein the background is a background structure, the background structure includes an exterior surface having a substantially non-textured neutral color, wherein the background structure is arranged at an angle to the video camera system, such that an axis extending normal to the exterior surface is offset from a direction toward the video camera system.

23. The video photography system of claim 17, wherein the video camera system comprises a system controller operable to perform control functions, a video camera operable to capture the photographs, and a computer readable storage device operable to store the photographs.

24. The video photography system of claim 23, wherein the video camera comprises a control unit, an image sensor, and a lens, and wherein the video camera is shutterless.

25. The video photography system of claim 17, wherein the video camera system comprises a video camera, a video stream capture device, and a computing device, wherein the video camera outputs the photographs captured by the video camera frame by frame in an uncompressed stream, the video stream capture device receives the uncompressed stream and feeds the uncompressed stream to the computing device.

26. A video photography system comprising:
a background structure including an exterior surface having a neutral color;
a video camera system including:
    a video camera configured to record a video of a subject arranged between the video camera system and the exterior surface of the background structure, the video including a plurality of photographs;
    a system controller operable to control the video camera; and
    a computer readable storage device;
    wherein the video camera system is configured to:
        receive a first input from a photographer;
        in response to receiving the first input, store at least a subset of the photographs captured over a first predetermined period of time in a buffer;
        receive a second input from the photographer, the second input indicating that a good expression has occurred; and
        in response to receiving the second input, store at least the subset of the photographs captured before receiving the second input in the computer readable storage device; and
a continuous subject lighting system including a foreground light source configured to provide continuous illumination of a subject while recording the video, the continuous lighting system including a main lighting system and a fill lighting system; and
a background lighting system including at least one light source, the at least one light source configured to generate a sequence of at least two lighting conditions including a first-colored lighting condition, and a second-colored lighting condition, wherein each of the at least two lighting conditions are distinguishable in the photographs.

* * * * *